(12) United States Patent
Rivers-Moore et al.

(10) Patent No.: US 7,197,515 B2
(45) Date of Patent: Mar. 27, 2007

(54) DECLARATIVE SOLUTION DEFINITION

(75) Inventors: Jonathan E. Rivers-Moore, Bellevue, WA (US); Jean D. Paoli, Kirkland, WA (US); Evgeny N. Veselov, Sammamish, WA (US); Kamaljit S. Bath, Bellevue, WA (US); Adriana Ardeleanu, Redmond, WA (US); Prakash Sikchi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 10/610,504

(22) Filed: Jun. 30, 2003

(65) Prior Publication Data

US 2004/0267813 A1    Dec. 30, 2004

(51) Int. Cl.
*G06F 17/30*    (2006.01)
*G06F 15/167*   (2006.01)
*G06F 15/16*    (2006.01)

(52) U.S. Cl. .................. 707/200; 707/100; 707/101; 707/102; 707/103 R; 707/104.1; 709/215; 709/217

(58) Field of Classification Search ............... 707/101, 707/103 R, 204, 100, 102, 10, 2, 3, 4, 5, 707/200, 104.1; 345/501, 418, 765; 715/514, 715/503; 714/57; 704/9; 717/128; 709/215, 709/217
See application file for complete search history.

(56) References Cited

U.S. PATENT DOCUMENTS

| 4,514,800 A | 4/1985 | Gruner et al. |
| 4,641,274 A | 2/1987 | Swank |
| 4,674,040 A | 6/1987 | Barker et al. |
| 4,723,211 A * | 2/1988 | Barker et al. ............... 715/514 |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,933,880 A | 6/1990 | Borgendale et al. |
| 4,962,475 A | 10/1990 | Hernandez et al. |

(Continued)

FOREIGN PATENT DOCUMENTS

EP    0 841 615 A2    5/1998

(Continued)

OTHER PUBLICATIONS

Description of Whitehill Composer software product producted by Whitehill Technologies Inc. available at <http://www.xml.com/pub/p/221> accessed on Apr. 8, 2004 two pages.

(Continued)

*Primary Examiner*—Frantz Coby
(74) *Attorney, Agent, or Firm*—Lee & Hayes, PLLC

(57) ABSTRACT

A solution is described that declares elements, attributes, and values that define a hierarchical data file or a markup-language document. The declarations by the solution are within the solution and include a presentation application and a markup-language schema from which the markup-language document can be inferred as having a structure based on the markup-language schema. Portions of the markup-language document are logically coupled with fragments of the markup-language schema. The presentation application, when executed, forms an electronic form containing data-entry fields associated with the coupled portions. The solution can include a manifest of all files that can be used for representing the markup-language document in the electronic form. The files also allow a user in input data into the one or more data-entry fields and control the validation of the data that the user inputs into the one or more data-entry fields.

80 Claims, 11 Drawing Sheets

U.S. PATENT DOCUMENTS

| | | |
|---|---|---|
| 5,072,412 A | 12/1991 | Henderson, Jr. et al. |
| 5,179,703 A | 1/1993 | Evans |
| 5,182,709 A * | 1/1993 | Makus ........................ 704/9 |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A * | 6/1993 | Morgan et al. ............. 345/501 |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,381,547 A | 1/1995 | Flug et al. |
| 5,390,325 A | 2/1995 | Miller |
| 5,396,623 A * | 3/1995 | McCall et al. ............. 707/101 |
| 5,408,665 A | 4/1995 | Fitzgerald |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,440,744 A | 8/1995 | Jacobson et al. |
| 5,446,842 A | 8/1995 | Schaeffer et al. |
| 5,459,865 A | 10/1995 | Heninger et al. |
| 5,481,722 A | 1/1996 | Skinner |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,659,729 A | 8/1997 | Nielsen |
| 5,664,178 A | 9/1997 | Sinofsky |
| 5,669,005 A | 9/1997 | Curbow et al. |
| 5,682,536 A | 10/1997 | Atkinson et al. |
| 5,689,703 A | 11/1997 | Atkinson et al. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,784,555 A | 7/1998 | Stone |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,911,776 A | 6/1999 | Guck |
| 5,915,112 A | 6/1999 | Boutcher |
| 5,922,072 A | 7/1999 | Hutchinson et al. |
| 5,929,858 A * | 7/1999 | Shibata et al. .............. 345/418 |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A * | 9/1999 | Brodsky et al. ............. 717/128 |
| 5,963,964 A | 10/1999 | Nielsen |
| 5,982,370 A | 11/1999 | Kamper |
| 5,987,480 A | 11/1999 | Donohue et al. |
| 5,991,710 A | 11/1999 | Papineni et al. |
| 5,995,103 A | 11/1999 | Ashe |
| 5,999,740 A | 12/1999 | Rowley |
| 6,014,135 A | 1/2000 | Fernandes |
| 6,016,520 A | 1/2000 | Facq et al. |
| 6,018,743 A * | 1/2000 | Xu ........................ 707/103 R |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A * | 3/2000 | Dauerer et al. ............. 715/503 |
| 6,044,205 A | 3/2000 | Reed et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,192,367 B1 * | 2/2001 | Hawley et al. ............. 707/102 |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |

| Patent No. | Date | Name | | Patent No. | Date | Name |
|---|---|---|---|---|---|---|
| 6,266,810 B1 | 7/2001 | Tanaka et al. | | 6,598,219 B1 | 7/2003 | Lau |
| 6,275,227 B1 | 8/2001 | DeStefano | | 6,604,099 B1 | 8/2003 | Chung et al. |
| 6,275,599 B1 | 8/2001 | Adler et al. | | 6,606,606 B2 | 8/2003 | Starr |
| 6,281,896 B1 | 8/2001 | Alimpich et al. | | 6,609,200 B2 | 8/2003 | Anderson et al. |
| 6,282,711 B1 | 8/2001 | Halpern et al. | | 6,611,822 B1 | 8/2003 | Beams et al. |
| 6,286,033 B1 | 9/2001 | Kishinsky et al. | | 6,611,840 B1 | 8/2003 | Baer et al. |
| 6,292,897 B1 | 9/2001 | Gennaro et al. | | 6,613,098 B1 | 9/2003 | Sorge et al. |
| 6,297,819 B1 | 10/2001 | Furst | | 6,615,276 B1 | 9/2003 | Mastrianni et al. |
| 6,308,179 B1 | 10/2001 | Petersen et al. | | 6,629,109 B1 | 9/2003 | Koshisaka |
| 6,311,271 B1 | 10/2001 | Gennaro et al. | | 6,631,357 B1 | 10/2003 | Perkowski |
| 6,321,259 B1 | 11/2001 | Ouellette et al. | | 6,631,379 B2 | 10/2003 | Cox |
| 6,321,334 B1 | 11/2001 | Jerger et al. | | 6,631,497 B1 | 10/2003 | Jamshidi et al. |
| 6,327,628 B1 | 12/2001 | Anuff et al. | | 6,631,519 B1 | 10/2003 | Nicholson et al. |
| 6,331,864 B1 | 12/2001 | Coco et al. | | 6,635,089 B1 | 10/2003 | Burkett et al. |
| 6,342,907 B1 | 1/2002 | Petty et al. | | 6,636,845 B2 | 10/2003 | Chau et al. |
| 6,343,302 B1 | 1/2002 | Graham | | 6,643,633 B2 | 11/2003 | Chau et al. |
| 6,345,256 B1 | 2/2002 | Milsted et al. | | 6,643,684 B1 | 11/2003 | Malkin et al. |
| 6,345,361 B1 | 2/2002 | Jerger et al. | | 6,654,737 B1 | 11/2003 | Nunez |
| 6,347,323 B1 | 2/2002 | Garber et al. | | 6,658,417 B1 | 12/2003 | Stakutis et al. |
| 6,349,408 B1 | 2/2002 | Smith | | 6,658,622 B1 | 12/2003 | Aiken et al. |
| 6,353,926 B1 | 3/2002 | Parthesarathy et al. | | 6,668,369 B1 | 12/2003 | Krebs et al. |
| 6,356,906 B1 | 3/2002 | Lippert et al. | | 6,678,717 B1 | 1/2004 | Schneider |
| 6,357,038 B1 | 3/2002 | Scouten | | 6,691,230 B1 | 2/2004 | Bardon |
| 6,366,907 B1 * | 4/2002 | Fanning et al. ............... 707/3 | | 6,691,281 B1 | 2/2004 | Sorge et al. |
| 6,366,912 B1 | 4/2002 | Wallent et al. | | 6,697,944 B1 | 2/2004 | Jones et al. |
| 6,369,840 B1 | 4/2002 | Barnett et al. | | 6,701,434 B1 | 3/2004 | Rohatgi |
| 6,369,841 B1 | 4/2002 | Salomon et al. | | 6,711,679 B1 | 3/2004 | Guski et al. |
| 6,374,402 B1 | 4/2002 | Schmeidler et al. | | 6,735,721 B1 * | 5/2004 | Morrow et al. ............... 714/57 |
| 6,381,742 B2 | 4/2002 | Forbes et al. | | 6,748,385 B1 | 6/2004 | Rodkin et al. |
| 6,381,743 B1 | 4/2002 | Mutschler, III et al. | | 6,751,777 B2 | 6/2004 | Bates et al. |
| 6,389,434 B1 | 5/2002 | Rivette et al. | | 6,760,723 B2 | 7/2004 | Oshinsky et al. |
| 6,393,456 B1 | 5/2002 | Ambler et al. | | 6,772,139 B1 | 8/2004 | Smith, III |
| 6,396,488 B1 | 5/2002 | Simmons et al. | | 6,772,165 B2 | 8/2004 | O'Carroll |
| 6,408,311 B1 | 6/2002 | Baisley et al. | | 6,774,926 B1 | 8/2004 | Ellis et al. |
| 6,421,070 B1 | 7/2002 | Ramos et al. | | 6,779,154 B1 | 8/2004 | Nussbaum et al. |
| 6,421,656 B1 | 7/2002 | Cheng et al. | | 6,816,849 B1 | 11/2004 | Halt, Jr. |
| 6,425,125 B1 | 7/2002 | Fries et al. | | 6,845,380 B2 | 1/2005 | Su et al. |
| 6,429,885 B1 | 8/2002 | Saib et al. | | 6,845,499 B2 | 1/2005 | Srivastava et al. |
| 6,434,563 B1 | 8/2002 | Pasquali et al. | | 6,848,078 B1 | 1/2005 | Birsan et al. |
| 6,434,564 B2 | 8/2002 | Ebert | | 6,871,220 B1 | 3/2005 | Rajan et al. |
| 6,442,755 B1 | 8/2002 | Lemmons et al. | | 6,874,130 B1 | 3/2005 | Baweja et al. |
| 6,446,110 B1 | 9/2002 | Lection et al. | | 6,876,996 B2 | 4/2005 | Czajkowski et al. |
| 6,449,617 B1 * | 9/2002 | Quinn et al. ............... 707/100 | | 6,889,359 B1 | 5/2005 | Conner et al. |
| 6,460,058 B2 | 10/2002 | Koppolu et al. | | 6,901,403 B1 | 5/2005 | Bata et al. |
| 6,470,349 B1 | 10/2002 | Heninger et al. | | 6,931,532 B1 | 8/2005 | Davis et al. |
| 6,473,800 B1 | 10/2002 | Jerger et al. | | 6,941,510 B1 | 9/2005 | Ozzie et al. |
| 6,476,828 B1 | 11/2002 | Burkett et al. | | 6,948,133 B2 | 9/2005 | Haley |
| 6,476,833 B1 | 11/2002 | Moshfeghi | | 6,963,875 B2 | 11/2005 | Moore |
| 6,477,544 B1 | 11/2002 | Bolosky et al. | | 6,968,505 B2 | 11/2005 | Stoll et al. |
| 6,480,860 B1 | 11/2002 | Monday | | 6,993,714 B2 | 1/2006 | Kaler et al. |
| 6,487,566 B1 | 11/2002 | Sundaresan | | 6,996,781 B1 | 2/2006 | Myers et al. |
| 6,493,702 B1 | 12/2002 | Adar et al. | | 7,003,722 B2 | 2/2006 | Rothchiller et al. |
| 6,502,101 B1 | 12/2002 | Verprauskus et al. | | 7,036,072 B1 | 4/2006 | Sulistio et al. |
| 6,502,103 B1 | 12/2002 | Frey et al. | | 7,039,875 B2 | 5/2006 | Khalfay et al. |
| 6,505,230 B1 | 1/2003 | Mohan et al. | | 7,086,009 B2 | 8/2006 | Resnick et al. |
| 6,505,300 B2 | 1/2003 | Chan et al. | | 7,107,282 B1 | 9/2006 | Yalamanchi |
| 6,507,856 B1 | 1/2003 | Chen et al. | | 2001/0022592 A1 | 9/2001 | Alimpich et al. |
| 6,516,322 B1 | 2/2003 | Meredith | | 2001/0024195 A1 | 9/2001 | Hayakawa |
| 6,519,617 B1 | 2/2003 | Wanderski et al. | | 2001/0037345 A1 | 11/2001 | Kiernan |
| RE38,070 E | 4/2003 | Spies et al. | | 2001/0056429 A1 | 12/2001 | Moore et al. |
| 6,546,546 B1 | 4/2003 | Van Doorn | | 2001/0056460 A1 | 12/2001 | Sahota et al. |
| 6,549,221 B1 | 4/2003 | Brown et al. | | 2002/0026441 A1 | 2/2002 | Kutay |
| 6,549,878 B1 | 4/2003 | Lowry et al. | | 2002/0026461 A1 | 2/2002 | Kutay |
| 6,549,922 B1 | 4/2003 | Srivastava et al. | | 2002/0032768 A1 | 3/2002 | Voskuil |
| 6,553,402 B1 | 4/2003 | Makarios et al. | | 2002/0035581 A1 | 3/2002 | Reyner et al. |
| 6,560,620 B1 | 5/2003 | Ching | | 2002/0040469 A1 | 4/2002 | Pramberger |
| 6,560,640 B2 | 5/2003 | Smethers | | 2002/0057297 A1 | 5/2002 | Grimes et al. |
| 6,563,514 B1 | 5/2003 | Samar | | 2002/0100027 A1 | 7/2002 | Binding et al. |
| 6,571,253 B1 | 5/2003 | Thompson et al. | | 2002/0112224 A1 | 8/2002 | Cox |
| 6,578,144 B1 | 6/2003 | Gennaro et al. | | 2002/0133484 A1 | 9/2002 | Chau et al. |
| 6,581,061 B2 | 6/2003 | Graham | | 2002/0152244 A1 | 10/2002 | Dean et al. |
| 6,584,548 B1 | 6/2003 | Bourne et al. | | 2002/0156772 A1 | 10/2002 | Chau et al. |
| 6,585,778 B1 | 7/2003 | Hind et al. | | 2002/0156929 A1 | 10/2002 | Hekmatpour |

| | | | |
|---|---|---|---|
| 2002/0169789 A1 | 11/2002 | Kutay | |
| 2002/0174147 A1 | 11/2002 | Wang et al. | |
| 2002/0184219 A1 | 12/2002 | Preisig et al. | |
| 2002/0188613 A1 | 12/2002 | Chakraborty et al. | |
| 2002/0196288 A1 | 12/2002 | Emrani | |
| 2002/0198891 A1 | 12/2002 | Li et al. | |
| 2002/0198935 A1 | 12/2002 | Crandall et al. | |
| 2003/0007000 A1 | 1/2003 | Carlson et al. | |
| 2003/0014397 A1 | 1/2003 | Chau et al. | |
| 2003/0018668 A1 | 1/2003 | Britton et al. | |
| 2003/0025732 A1* | 2/2003 | Prichard | 345/765 |
| 2003/0037303 A1 | 2/2003 | Bodlaender | |
| 2003/0043986 A1 | 3/2003 | Creamer | |
| 2003/0046665 A1 | 3/2003 | Ilin | |
| 2003/0051243 A1 | 3/2003 | Lemmons et al. | |
| 2003/0056198 A1 | 3/2003 | Al-Azzawe | |
| 2003/0061386 A1 | 3/2003 | Brown | |
| 2003/0120659 A1 | 6/2003 | Sridhar | |
| 2003/0120671 A1 | 6/2003 | Kim et al. | |
| 2003/0120686 A1 | 6/2003 | Kim et al. | |
| 2003/0140132 A1 | 7/2003 | Champagne et al. | |
| 2003/0158897 A1 | 8/2003 | Ben-Natan et al. | |
| 2003/0167277 A1 | 9/2003 | Hejlsberg et al. | |
| 2003/0182268 A1 | 9/2003 | Lal | |
| 2003/0187930 A1 | 10/2003 | Ghaffar et al. | |
| 2003/0189593 A1 | 10/2003 | Yarvin | |
| 2003/0204511 A1 | 10/2003 | Brundage | |
| 2003/0204814 A1 | 10/2003 | Elo et al. | |
| 2003/0205615 A1 | 11/2003 | Marappan | |
| 2003/0212664 A1 | 11/2003 | Breining et al. | |
| 2003/0225768 A1 | 12/2003 | Chaudhuri | |
| 2003/0225829 A1 | 12/2003 | Pena et al. | |
| 2003/0226132 A1 | 12/2003 | Tondreau et al. | |
| 2003/0237046 A1 | 12/2003 | Parker et al. | |
| 2003/0237047 A1 | 12/2003 | Borson | |
| 2004/0002939 A1 | 1/2004 | Arora | |
| 2004/0010752 A1 | 1/2004 | Chan et al. | |
| 2004/0044961 A1 | 3/2004 | Pesenson | |
| 2004/0059754 A1 | 3/2004 | Barghout | |
| 2004/0073565 A1 | 4/2004 | Kaufman et al. | |
| 2004/0117769 A1 | 6/2004 | Lauzon et al. | |
| 2004/0123277 A1 | 6/2004 | Schrader et al. | |
| 2004/0146199 A1 | 7/2004 | Berkner et al. | |
| 2004/0163041 A1 | 8/2004 | Engel | |
| 2004/0186762 A1 | 9/2004 | Beaven | |
| 2004/0205473 A1 | 10/2004 | Fisher et al. | |
| 2004/0205571 A1 | 10/2004 | Adler et al. | |
| 2004/0205592 A1 | 10/2004 | Huang | |
| 2004/0205605 A1 | 10/2004 | Adler et al. | |
| 2004/0221245 A1 | 11/2004 | Chickles et al. | |
| 2005/0015732 A1 | 1/2005 | Vedula et al. | |
| 2005/0027757 A1* | 2/2005 | Kiessig et al. | 707/204 |
| 2005/0102370 A1 | 5/2005 | Lin et al. | |
| 2005/0171748 A1 | 8/2005 | Thalhammer-Reyero | |
| 2005/0198086 A1 | 9/2005 | Moore | |
| 2005/0223320 A1 | 10/2005 | Brintzenhofe et al. | |
| 2006/0020586 A1 | 1/2006 | Prompt et al. | |
| 2006/0031757 A9 | 2/2006 | Vincent | |
| 2006/0036995 A1 | 2/2006 | Chickles et al. | |
| 2006/0041838 A1 | 2/2006 | Khan | |
| 2006/0085409 A1 | 4/2006 | Rys et al. | |

FOREIGN PATENT DOCUMENTS

| | | |
|---|---|---|
| EP | 0 961 197 | 12/1999 |
| EP | 1 076 290 A2 | 2/2001 |
| JP | 63085960 | 4/1988 |
| JP | 401173140 | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 01/44934 A1 | 6/2001 |

OTHER PUBLICATIONS

Laura Acklen & Read Gilgen, "Using Corel Wordperfect 9", 251-284, 424-434, 583-586 (1998).

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Leblond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Noore A.; "A secure conditional access system using digital signature and encryption" 2003 Digest of Technical Papers. International Conference on Consumer Electronics Jun. 2003 pp. 220-221.

Komatsu, N., et al., "A Proposal on Digital Watermark in Document Image Communication and Its Application to Realizing a Signature," Electronics and Communications in Japan, Part I: Communications, vol. 73, No. 5, May 1990, pp. 22-33.

Sun Q. et al.; "A robust and secure media signature scheme for JPEG images" Proceedings of 2002 IEEE Workshop on Multimedia Signal Processing Dec. 2002 pp. 296-299.

Description of Whitehill Composer software product, produced by Whitehill Technologies, Inc., available at .xml.com/pub/p/221>, accessed on Apr. 8, 2004, two pages.

Pacheco, X., et al., "Delphi 5 Developer's Guide," Sams Publishing 1999, Chapter 31, Section: Data Streaming, 6 pages.

Clarke, P., "From small beginnings," Knowledge Management, Nov. 2001, pp. 28-30.

Hwang, et al; "Micro-Firewalls for Dynamic Network Security with Distributed Intrusion Detection"; IEEE International Symposium on Network Computing and Applications; 2001; pp. 68-79.

Schmid, et al; "Protecting Data from Malicious Software"; 18th Annual Computer Security Applications Conference; 2002; pp. 199-208.

Kaiya, et al; "Specifying Runtime Environments and Functionalities of Downloadable Components Under the Sandbox Model"; International Symposium on Principles of Softwre Evolution; 2000; pp. 138-142.

Prevelakis, et al; "Sandboxing Applications"; Proceedings of the FREENIX Track; 2001; pp. 119-126.

Tomimori, et al; "An Efficient and Flexible Access Control Framework for Java Programs in Mobile Terminals"; 22nd International Conference on Distributed Computing Systems Workshops; 2002; pp. 777-782.

Clark; James, Ed.; "XSL Transformation (XSLT) Version 1.0," Nov. 16, 1999, W3C (MIT, INRIA, Keio), pp. 1-156.

Clark, James and Steve Derose, "XML Path Language (XPath) Version 1.0," Nov. 16, 1999, W3C (MIT, INRIA, Keio), pp. 1-49.

Musgrave, S., "Networking technology—impact and opportunities," Survey and Statistical Computing 1996. Proceedings of the Second ASC International Conference. Sep. 1996. pp. 369-378. London, UK.

Rapaport, L., "Get more from SharePoint," Transform Magazine, vol. 11, No. 3, Mar. 2002, pp. 13, 15.

McCright, J.S., "New Tool Kit to Link Groove with Microsoft SharePoint," eWeek, Enterprise News & Reviews, Ziff Davis Media Inc., Jul. 29, 2002, 1 page.

U.S. Appl. No. 60/209,713, filed Jun. 5, 2000.

Richard Scott Hall, "Agent-based Software Configuration and Deployment," Thesis of the University of Colorado, Online, Dec. 31, 1999, retrieved from the Internet on Nov. 7, 2003: cs.colorado.edu/users/rickhall/documents/ThesisFinal.pdf>, 169 pages.

Arthur Van Hoff et al., "The Open Software Description Format," Online, Aug. 13, 1997, retrieved from the Internet on Nov. 7, 2003:w3.org/TR/NOTE-OSD>, 11 pages.

Netscape Communications Corp., "SmartUpdate Developer's Guide," Online, Mar. 11, 1999, retrieved from the Internet on Dec. 8, 2000:developer.netscape.com:80/docs/manuals/communicator/jarman/index.htm>, 83 pages.

Linnea Dayton and Jack Davis, "Photo Shop 5/5.5 WOW! Book," 2000, Peachpit Press, pp. 8-17.

Sara Williams and Charlie Kindel, "The Component Object Model: A Technical Overview," Oct. 1994, Microsoft Corp., pp. 1-14.

Varlamis et al., "Bridging XML-Schema and relational databases. A system for generating and manipulating relational databases using valid XML documents," DocEng '01, Nov. 9-10, 2001, Copyright 2001, ACM 1-58113-432-0/01/0011, pp. 105-114.

Hardy et al., "Mapping and Displaying Structural Transformations between XML and PDF," DocEng '02, Nov. 8-9, 2002, Copyright 2002, ACM 1-58113-594-7/02/0011, pp. 95-102.

Kim et al., "Immediate and Partial Validation Mechanism for the Conflict Resolution of Update Operations in XML Databases," WAIM 2002, LNCS 2419, 2002, pp. 387-396, Springer-Verlag Berlin Heidelberg 2002.

Chuang, T., "Generic Validation of Structural Content with Parametric Modules," ICFP '01, Sep. 3-5, 2001, Copyright 2001, ACM 1-58113-415-0/01/0009, pp. 98-109.

Chen et al., "Designing Valid XML Views," ER 2002, LNCS 2503, 2002, Springer-Verlag Berlin Heidelberg 2002, pp. 463-477.

Chen et al., "XKvalidator: A Constraint Validator for XML," CIKM '02, Nov. 4-9, 2002, Copyright 2002, ACM 1-58113-492-4/02/0011, pp. 446-452.

William Brogden, "Arbortext Adept 8 Editor Review," O'Reilly XML.COM, 'Online! Sep. 22, 1999) XP002230080, retrieved from the Internet <URLxml.com/pub/a/1999/09/adept/AdeptRvw.htm>, retrieved on Feb. 5, 2003.

Liora Alschuler, "A tour of XMetal" O'Reilly XML.COM, 'Online! Jul. 14, 1999, XP002230081, retrieved from the Internet: <URLwww.xml.com/pub/a/SeyboldReport/ip031102.html>, retrieved on Feb. 5, 2003.

Ari Davidow, "XML Editors: Allegations of Functionality in search of reality," INTERNET, 'Online! 1999, XP002230082, retrieved from the Internet, <URL.ivritype.com/xml/>.

Steven A. Battle, et al., "Flexible Information Presentation with XML", 1998, The Institution of Electrical Engineers, 6 pages.

Paolo Ciancarini, et al., "Managing Complex Documents Over the WWW: A Case Study for XML", IEEE Transactions on Knowledge and Data Engineering, vol. 11, No. 4, Jul./Aug. 1999, pp. 629-638.

Hirotaka Kanemoto, et al., "An Efficiently Updatable Index Scheme for Structured Documents", 1998 IEEE, pp. 991-996.

Tommie Usdin, et al., "XML: Not a Silver Bullet, But a Great Pipe Wrench", Standardview vol. 6, No. 3, Sep. 1998, pp. 125-132.

Supoj Sutanthavibul, et al., "XFIG Version 3.2 Patchlevel 2(Jul. 2, 1998) Users Manual (Edition 1.0)", Internet Document, [Online] Jul. 2, 1998, XP002229137 Retrieved from the Internet: <URLice.mtu.edu/online_docs/xfig332/> [retrieved on Jan. 28, 2003].

"Architecture for a Dynamic Information Area Control", IBM Technical Disclosure Bulletin, IBM Corp. New York, US, vol. 37, No. 10, Jan. 10, 1994, pp. 245-246.

Irene Au & Shuang Li, "Netscape Communicator's Collapsible Toolbars," CHI '98, Human Factors in Computing Systems, Conference Proceedings, Los Angeles, CA, Apr. 18-23, 1998, pp. 81-86.

Netscape Communication Corporation: "Netscape Communicator 4.61 for OS/2 Warp" Software, 1999, The whole software release & "Netscape—Version 4.61 [en]—010615" Netscape Screenshot, Oct. 2, 2002.

Rogge et al., "Validating MPEG-21 Encapsulated Functional Metadata," IEEE 2002, pp. 209-212.

Nelson, "Validation with MSXML and XML Schema," Windows Developer Magazine, Jan. 2002. pp. 35-38.

Chien et al., "XML Document Versioning," SIGMOD Record, vol. 30, No. 3, Sep. 2001, pp. 46-53.

Wong et al., "Managing and Querying Multi-Version XML Data with Update Logging," DocEng '02, Nov. 8-9, 2002, Copyright 2002, ACM 1-58113-594-7/02/0011, pp. 74-81.

Chien et al., "Efficient schemes for managing multiversionXML documents", VLDB Journal (2002), pp. 332-353.

Chien et al., "Efficient Management of Multiversion Documents by Object Referencing," Proceedings of the 27th VLDB Conference, 2001, pp. 291-300.

Chien et al., "Storing and Querying Multiversion XML Documents using Durable Node Numbers," IEEE 2002, pp. 232-241.

Dyck, T., "XML Spy Tops as XML Editor," eweek.com/article2/0,3959,724041,00.asp, Nov. 25, 2002, 4 pages.

"Netscape window" Netscape Screenshot, Oct. 2, 2002.

Jan-Henrick Haukeland: "Tsbiff—tildeslash biff—version 1.2.1" Internet Document, [Online] Jun. 1999, URL//web.archive.org/web/19990912001527/tildeslash.com/tsbiff/.

Atova, "User Reference manual Version 4.4, XML Spy suite 4.4," Atova Ges.m.b.H & Altova, Inc., May 24, 2002, pages cover, copyright page, 1-565.

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

U.S. Appl. No. 60/191,662, Kutay et al.

U.S. Appl. No. 60/203,081, Ben-Natan et al.

"Store and Organize Related Project Files in a Binder," Getting Results with Microsoft Office, 1990, pp. 109-112.

Barker et al., "Creating In-Line Objects Within An Integrated Editing Environment," IBM Technical Disclosure Bulletin, vol. 27, No. 5, Oct. 1984, pp. 2962.

Berg A., "Naming and Binding: Monikers" Inside OLE, 1995, Chapter 9, pp. 431-490.

Clapp D., "The NeXT Application Kit Part I: Non-Responsive Classes," The NeXT Bible 1990, Chapter 16, pp. 275-293.

DiLascia et al., "Sweeper" Microsoft Interactive Developer, vol. 1, No. 1, 1996, 27 pages.

Herzner et al., "CDAM- Compound Document Access and Management. An Object-Oriented Approach" Multimedia Systems Interaction and Applications, 1992, Chapter 3, pp. 17-36.

Kobayashi et al., "An Update on BTRON-specification OS Development" IEEE 1991 pp. 132-140.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Staneck W., "Internal and External Media" Electronic Publishing Unleashed, 1995, Chapter 22, pp. 510-542.

Zdonik S., "Object Management System Concepts," ACM, 1984, pp. 13-19.

Trupin J., "The Visual Programmer," Microsoft Systems Journal, Apr. 1996, pp. 103-105.

OMG XML Metadata Interchange (XMI) Specification Version 1.2 Jan. 2002.

Altova, Inc., "XML Spy 4.0 Manual," Altova Inc. & Altova GmbH, copyright 1998-2001, Chapters 1, 2, and 6, encompassing pp. 1-17, 18-90, and 343-362.

Cybook, INC.: "Copying the Search Form to Services-based Web Sites" INternet Article, (online) Jul. 26, 2004.*the whole document*.

Excel Developer Tip (hereinafter "Excel"), "Determining the Data Type of a Cell", May 13, 1998, p. 1 (available at http://jwalk.com/ss//excel/tips/tip62.htm).

Macromedia, INC.: "Dreamweaver Technote, Changes in copying and pasting in Dreamweaver 4" Internet Article (online). *the whole document*.

Rado, Dave: "How to create a template that makes it easy for users to "fill in the blanks", without doing any programming" Microsoft Word MVP FAQ Site, (online) Apr. 30, 2004, the whole document.

Cover, XML Forms Architecture, retrieved at ://xml.coverpages.org/xfa.html>> on Aug. 17, 2006, Coverpages, Jun. 16, 1999.

Raggett, "HTML Tables", retrieved on Aug. 06, 2006 at ://is-edu.hcmuns.edu.vn/WebLib/books/Web/Tel/html3-tables.html>>, W3C Internet Draft, Jul. 07, 1995, pp. 1-12.

"Webopedia Computer Dictionary" retrieved on May 09, 2006, at <<.pewebopedia.com/TERM/O/OLE.html>>, Jupitermedia Corporation, 2006, p. 07.

* cited by examiner

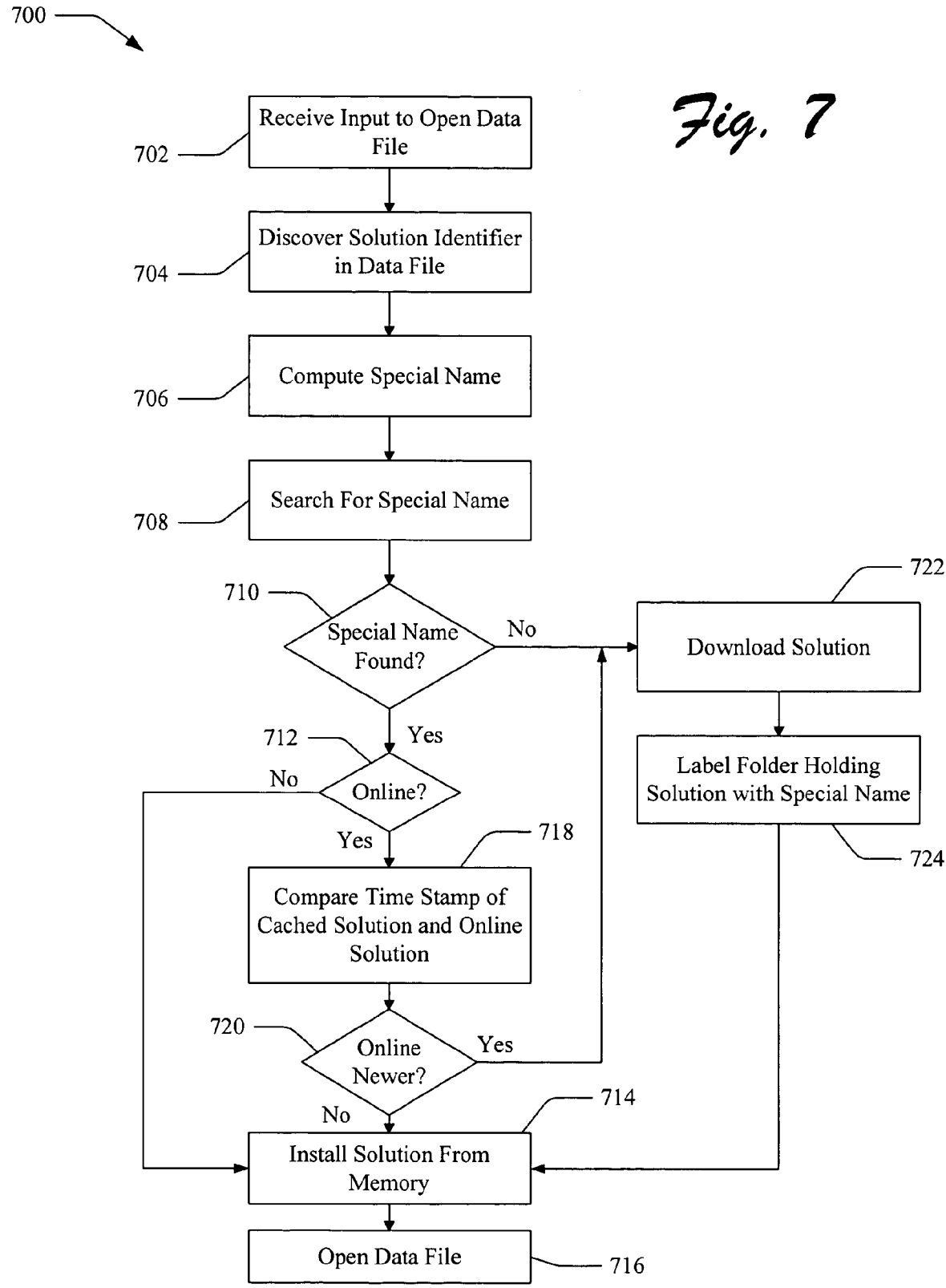

DECLARATIVE SOLUTION DEFINITION

RELATED APPLICATIONS

This application claims priority to the following applications, each of which is incorporated in its entirety by reference:

U.S. patent application Ser. No. 10/395,506, filed on Mar. 24, 2003, titled "System and Method for Designing Electronic Forms";

U.S. patent application Ser. No. 10/404,312, filed on Mar. 31, 2003, titled "System and Method for Incrementally Transforming and Tendering Hierarchical Data Files", and referencing;

U.S. patent application Ser. No. 10/402,640, filed on Mar. 28, 2003, titled "System and Method for Real-Time Validation of Structured Data Files";

U.S. patent application Ser. No. 10/395,490, filed on Mar. 24, 2003, titled "System and Method for Offline Editing of Data Files"; and U.S. patent application Ser. No. 10/395,505, filed on Mar. 24, 2003, titled "System and Method for Designing Electronic Forms and Hierarchical Schemas".

TECHNICAL FIELD

This invention generally relates to writing data to, and viewing data in, an electronic form that is related to a hierarchical data file, and more particularly, to a solution for a hierarchical data file that declaratively defines features of the hierarchical data file, where an electronic form can be rendered by using the solution to transform the hierarchical data file such that the electronic form can be used to write data to, and view data in, the hierarchical data file.

BACKGROUND

Extensible markup language (XML) is increasingly becoming the preferred format for transferring data. XML is a tag-based hierarchical language that is extremely rich in terms of the data that it can be used to represent. For example, XML can be used to represent data spanning the spectrum from semi-structured data (such as one would find in a word processing document) to generally structured data (such as that which is contained in a table). XML is well-suited for many types of communication including business-to-business and client-to-server communication. For more information on XML, XSLT, and XSD (schemas), the reader is referred to the following documents which are the work of, and available from the W3C (World Wide Web consortium): XML Schema Part 2: Datatypes; XML Schema Part 1: Structures, and XSL Transformations (XSLT) Version 1.0; and XML 1.0 second edition specification.

One of the reasons that data files written in XML are often preferred for transferring data is that XML data files contain data, rather than a combination of data and the software application needed to edit the data. Using XML is advantageous, as opposed to a binary data format, because it is all in the ASCII format which makes it possible to view and edit a raw XML file using standard applications like an Internet browser and a text editor.

In some applications, in order to edit an XML data file, a user typically must interactively install a solution software application used to access, view, and edit the data file. When the user is online, the user's computer can run a host application capable of accessing the Internet, such as Microsoft® Internet Explorer®, which can silently discover and deploy a solution, which can be written in XSLT, where the solution enables the user to author and access an XML data file. Alternatively, some XML files can be directly viewed in an Internet browser so that a specific may not be needed for this specific purpose.

One of application, information to be put into XML data files can be collected electronically using, for example, Internet (e.g., web) or online electronic forms. Tools for using the electronic forms must be custom built applications or must use proprietary electronic forms tools. Using these custom applications and proprietary electronic forms tools, causes at least four significant problems. The first problem is that the process of gathering information electronically can be inefficient. Inefficiencies occur for several reasons. One reason is that data entry personal can provide inconsistent data. Data inconsistencies occur where information is missing or provided in different formats. As such, those responsible for gathering, analyzing or summarizing the data must go back and reconcile the information provided. Another data inconsistency occurs because people provide information to one person who then inputs the data into some sort of electronic form or tool. Because the data has to be re-typed by someone who isn't the subject matter expert, this process leads to inaccurate data and to an inefficient data gathering process.

A second problem with using custom applications and proprietary electronic forms tools is that the resultant electronic forms or documents aren't very easy to use and can be extremely inflexible. Many conventional electronic forms do not provide a rich, traditional document editing experience. Without tools or features such as rich text formatting, and spell checking, these forms can be hard to use. And as a result, people don't use them as frequently as they should—leading to loss of invaluable organizational information. Additionally, conventional electronic forms are static in nature, where users have to fit their information into a set number of fields and don't have the ability to explain the context behind the information. What this means is that the information provided is often incomplete. As such, the person who consumes the information has to go back to the users to find out the real story behind the data.

A third problem with using custom applications and proprietary electronic forms tools is that they require considerable expense in order to build a solution that enables a user to author and access data using an electronic form or document corresponding to the solution. Such conventional electronic forms or documents can be difficult to modify because they were built for a specific purpose and required development work. Validation of data entered in conventional electronic forms for documents requires a developer to write code or script. Additionally, data entry personnel must be trained on how to use the conventional electronic forms for documents. Moreover, once the data is collected for an organization using the conventional electronic forms, the data is difficult to re-use or re-purpose elsewhere in the organization because the collected data is locked into proprietary documents and data formats. To reuse this data, the organization must invest in significant development work to extract the data from the appropriate sources and translate the data from one format to another.

Given the foregoing, it would be an advantage in the art to provide a solution for a data file by which electronic forms can be used to enter data into and view data in the data file, where the solution addresses the foregoing problems.

SUMMARY

The following description and figures describes a solution for a data file. The solution, which can be silently discovered and deployed, is useful injunction with an interactive tool that enables a user to enter data into the data file, to edit data in the data file, and to view data in the data file. When a user first opens the data file the interactive tool can request and receive the solution for the data file, such as by download of the solution from a network resource into a cache memory of the computing device being used by the user.

The data file (e.g., an XML data file) to which the solution corresponds has a hierarchical arrangement of a plurality of nodes where each node has a structure. A special name in the solution can be computed from a solution identifier in the data file. The special name is used opening the data file to silent discover and deploy the solution. A presentation application in the solution, when executed in conjunction with the opening of the data file, displays data in the data file in a plurality of data-entry fields in an electronic form. The plurality of data-entry fields of the electronic form are mapped to a corresponding plurality of the nodes of the data file. The solution, which can be modified, declaratively defines aspects of the data file such as its elements, attributes, and values. The data is entered in the electronic form such that it can be can be repurposed.

BRIEF DESCRIPTION OF THE DRAWINGS

The detailed description is described with reference to the accompanying figures in which the same numbers are used throughout the disclosure and figures to reference like components and features. Series 100 numbers refer to features originally found in FIG. 1, series 200 numbers refer to features originally found in FIG. 2, and series 300 numbers refer to features originally found in FIG. 3, and so on.

FIG. 7 is a flow diagram of an exemplary process for editing of data files while online or offline.

DETAILED DESCRIPTION

Figure 1:
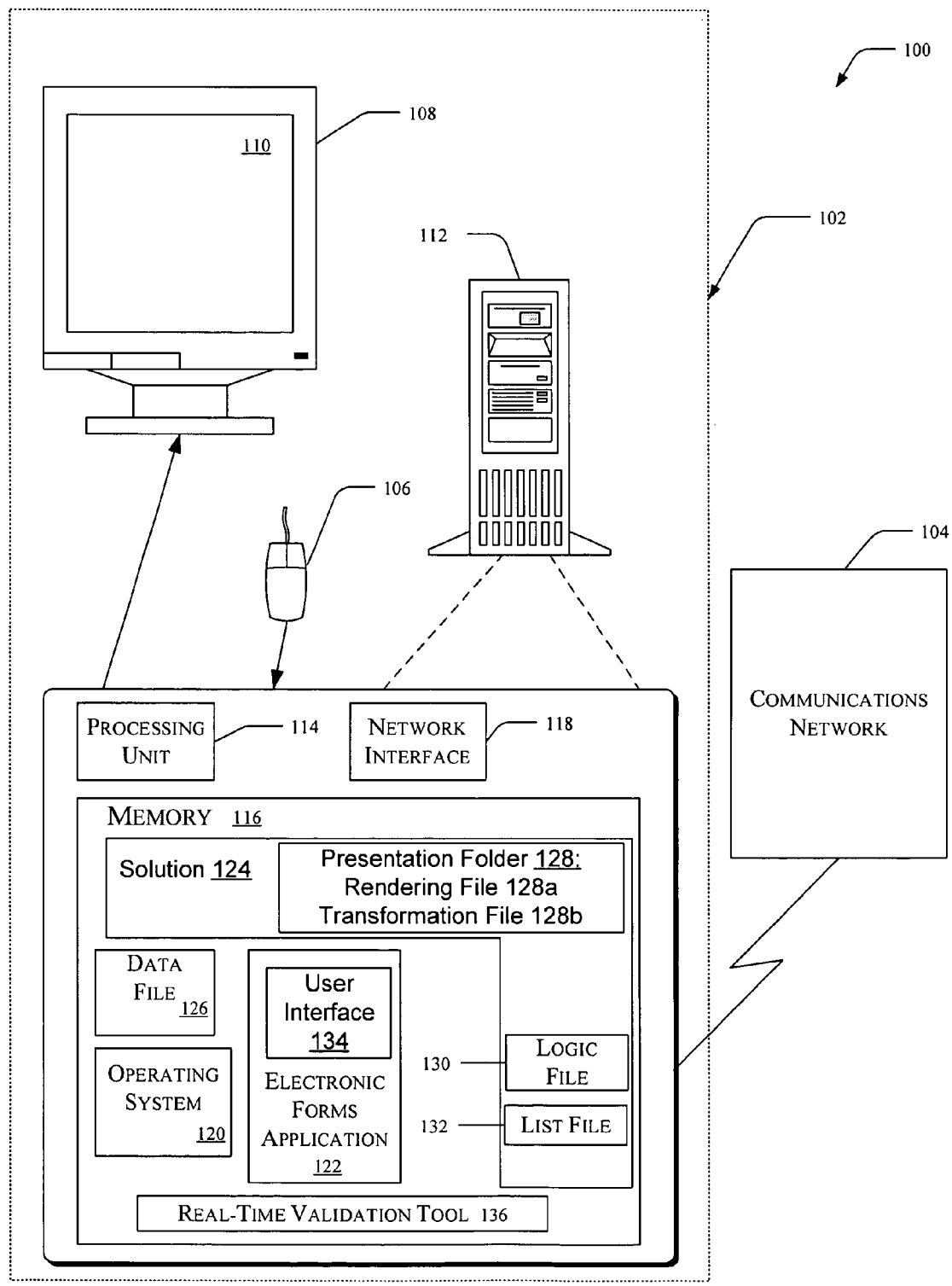
FIG. 1 illustrates a communications network and a system capable of implementing a method for silently discovering and deploying a solution that corresponds to a data file having a hierarchical arrangement of a plurality of nodes, where the method includes use of the solution with an interactive tool that enables a user to enter data into the data file, to edit data in the data file, and to view data in the data file.

The following disclosure describes a way to access data files, either when online or when offline, using an electronic forms application. The disclosure also addresses the definition of interactivity and authoring experiences, connections to external data sources, and other functionalities with respect to the electronic forms application. If a user has opened a data file first online, or if the system has otherwise received the data file's solution, the electronic forms application can silently discover and deploy the data file's solution. The data file's solution declaratively defines aspects a data file such as its elements, attributes, and values, as will be discussed below. The electronic forms application allows a user to simply select a data file to open and the electronic forms application will open the data file with a discovered and deployed solution. The user need not discover, select, or even be aware that the data file requires a solution for the data file to be edited. After selecting the data file to open, the user can then edit and access the data file in a way very similar to how it would act and appear had the user opened the data file while online.

Data Files, Solutions, and Host Applications

Data files, their solutions, and a host application work together to allow a user to open and edit the data file. Data files contain little or no operable code, where as a solution file contains presentation and logic applications. The presentation and logic applications of a solution file declaratively define aspects a data file such as its elements, attributes, and values. The elements, attributes, and values that are declaratively defined can include a schema for the data file, one or more views that can be used for viewing and entering data in the data file, a manifest of one of more files that enable contextual editing of the data file, and one of more user interfaces that can be used with the one or more views and can include functional components such as toolbars, menu bars, buttons, or task pane. Other declaratively defined elements, attributes, and values include a usage of specific event handlers and/or specific error handlers, and a definition of one or more back-end servers to which connectivity is available.

The elements, attributes, and values can also be programmatically defined in addition to the foregoing declarative definition. Specifically, the programmatic definition can be written in a programming code using a scripting language and can include validation rules for data entry with respect to the data file, custom error processing, implementations of data routing (data submission), and algorithms for connecting programmatically to databases, Web services or other back-end systems.

Editing a data file requires a solution. If a user tries to open a data file without a solution, the user could get an error or perhaps a flat list of the data in the data file. In order to view and edit the data file, the data file's solution is needed. As such, a solution has a corresponding solution application for the data file. The solution application is one or more files that, when installed, are used to enable a user to view, access, and edit the data file.

In addition to the data file and its solution, a host application is needed. This application works to enable the solution to function fully. In this description, an electronic forms application is described, which is capable not only of acting as a host application (allowing a solution to function properly), but can also allow a user to open a data file without actively finding and installing the data file's solution.

For discussion purposes, the system and method described herein are described in the context of a single computer, a communications network, a user-input device, and a display screen. These devices will be described first, followed by a discussion of the techniques in which these and other devices can be used.

Exemplary Architecture

FIG. 1 shows an exemplary architecture 100 to facilitate online and offline editing of data files. This architecture 100 includes a computing system 102 connected to a communications network 104. The system 102 is configured to go online and communicate via the communications network 104 to gain access to non-local information sources, such as sources on an intranet or global network. Alternatively, the system 102 can remain offline, where it utilizes local resources without communicating over the communications network 104.

The computing system 102 includes a user-input device 106, a display 108 having a screen 110, and a computer 112. The user-input device 106 can include any device allowing a computer to receive a user's preferences, such as a keyboard, a mouse, a touch screen, a voice-activated input device, a track ball, and the like. With the user-input device 106, a user can edit a data file by adding or deleting information within a data-entry field on an electronic form, for instance. The user can use the display 108 and the electronic form on screen 110 to view the data files. An electronic form, with respect implementations of the electronic forms application 122 described herein, is a document with a set of controls into which users can enter information. Electronic forms can contain controls that have features such as rich text boxes, date pickers, optional and repeating sections, data validation, and conditional formatting.

The computer 112 includes a processing unit 114 to execute applications, a memory 116 containing applications and files, and a network interface 118 to facilitate communication with the communications network 104. The memory 116 includes volatile and non-volatile memory, and applications, such as an operating system 120 and the electronic forms application 122. The memory 116 also includes a solution 124 for a data file 126. The solution 124 is located locally in the memory 116, but often has a different original source, such as a source on the communications network 104. The solution 124 contains one or more files and folders, such as a presentation folder 128, a logic file 130, and a list file 132. The presentation folder 128 includes a rendering file 128a and transformation file 128b. The components of solution 124 will be discussed in greater detail below.

The electronic forms application 122 facilitates offline editing of the data files 126 and is executed by the processing unit 114. The electronic forms application 122 is capable of acting as a host application and enabling a user to open the data file 126 without actively finding and installing the data file's solution 124. Without any user interaction, other than the user attempting to open the data file 126, the electronic forms application 122 discovers and installs the data file's solution 124. Thus, the user does not have to do anything but request to open the data file 126. The user does not have to discover the data file's solution 124. The user does not have to install the data file's solution 124. This silent discovery and deployment allows the user to view, edit, and otherwise interact with the data file 126 with just a single request. In addition, the electronic forms application 122 can provide security offline similar to the security that the user typically enjoys when running a solution online.

A view of the data file 126 can be depicted on screen 110 through execution of the data file's solution 124. The solution 124 contains one or more applications and/or files that the electronic forms application 122 uses to enable a user to edit the data file 126. To edit the data file 126 in a user-friendly way, the data file's solution 124 contains the presentation folder 128, which includes an electronic form. This presentation folder 128 is a container for components that, when used, give the user a graphical, visual representation of data-entry fields showing previously entered data or blank data-entry fields into which the user can enter data. Data files often have one solution but each solution often governs multiple data files.

Figure 2:
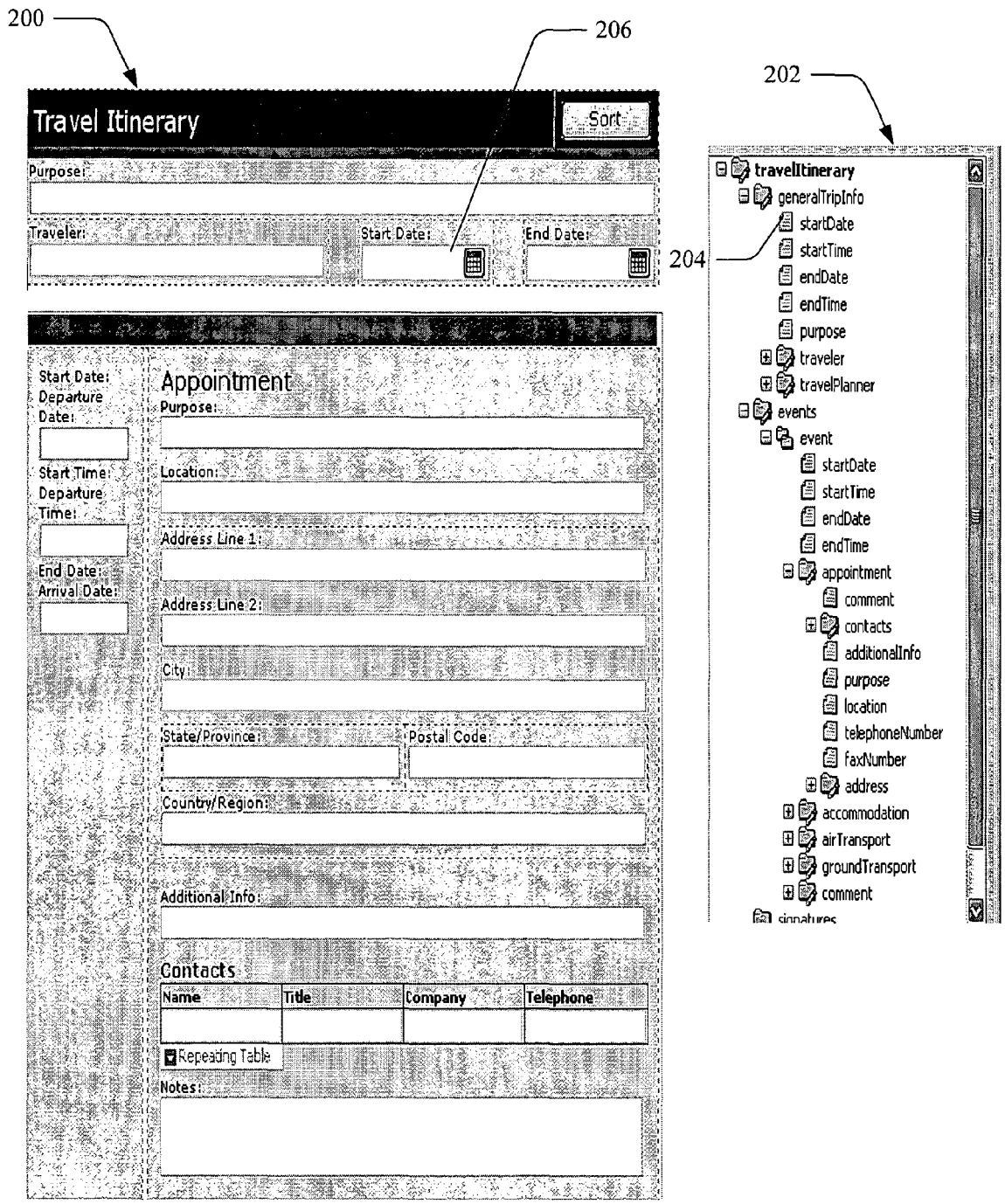
FIG. 2 illustrates an exemplary screen having a display area depicting a rendered blank electronic form and an incomplete view of a rendered form of a hierarchical data file, where both the blank electronic form and the rendered form of the hierarchical data file correspond to the hierarchical data file, and where the electronic form can be used by a user to enter data into the hierarchical data file, to edit data in the hierarchical data file, and to view data in the hierarchical data file.

FIG. 2 shows an electronic form 200 entitled "Travel Itinerary", which is generated by the solution 124. This travel itinerary form 200 contains data-entry fields in which a user can enter data. These data-entry fields map to the data file 126, so that the data entered into the form are retained in the data file 126. FIG. 2 shows a graphical representation of the data file 126 as a data file tree 202. The data file tree 202 shows icons representing nodes of the data file 126. Many of these nodes correlate to data-entry fields shown in the travel itinerary rendered form 200. For instance, a trip start date node 204 correlates to the trip start date data-entry field 206. Thus, data entered by a user into the trip start date data-entry field 206 can be stored in the trip start date node 204 of the data file 126.

The solution 124 presents the travel Itinerary form 200 but also contains the logic file 130 that governs various aspects of the travel Itinerary form 200 and the data file 126. In a data-entry field 206, for instance, the solution 124 can be configured so as to present the data-entry field 206 in a variety of visual appearances, such as by providing a white box within a gray box, by providing a description of the data desired with the text "Start Date", and by providing logic that requires the user to pick a date by clicking on a calendar icon. Thus, if the user attempted to enter letters, the logic file 130 of the solution 124 would not permit the user's entry. The solution 124 could reject it and inform the user of the problem, such as with a sound, flashing error signal, pop-window, or the like.

The logic file 130 is employed in the solution 124 to ensure that the right kind of data is being entered and retained by the data file 126. A user's business manager attempting to reference dates with a reference number, for instance, would like the solution 124 to have dates in the data-entry field 206, otherwise, the manager may not be able to determine how a travel itinerary should be handled if the date is entered incorrectly because it contains letters.

Similarly, suppose a business manager wants the travel date for a trip. To require this, the logic file 130 of travel itinerary form 200's solution 124 could be constructed to require a date to be entered into the date data-entry field 206. The logic file 130 can be internal to the solution 124. The logic file 130 can also be a schema, such as an XML schema. Here, the XML schema is a formal specification, written in XML, that defines the structure of an XML document, including element names and rich data types, which elements can appear in combination, and which attributes are available for each element.

A solution can govern multiple data files. The exemplary travel itinerary form 200, for example, allows one or more users to fill out many different trips. Each time a user fills out a travel itinerary form 200, the system 102 can create a separate data file for that trip. Often, a user will create many different data files having the same solution. For each data file edited after the first, the system 102 is likely to have the appropriate solution stored in the memory 116. Thus, if a user previously opened a first data file and later attempts to open a second data file, both of which utilize the travel itinerary form 200 solution, the electronic forms application 122 can silently discover and deploy the travel itinerary form 200 solution to enable the user to edit the second data file. How the electronic forms application 122 discovers and deploys solutions will be discussed in greater detail below.

A solution can be one file or contain many files, so long as the files used to edit data files it governs are included. In one implementation, the solution 124 of FIG. 1 includes the listing file 132, which is a manifest of all of the other files in the solution 124 and contains information helping the electronic forms application 122 to locate them. In an alternative information, this information can be inside a 'manifest file' so as to accomplish a similar function. The logic file 130 and presentation folder 128 can be joined or separate. The presentation folder 128 helps the electronic forms application 122 present or give a view of a form enabling entry of data into the data file 126, such as a visual representation of the data file 126 by the travel itinerary form 200 electronic form. In some implementations, the presentation file is an XSLT file, which, when applied to an XML data file, generates a XHTML (eXtensible Hyper-Text Markup Language) or HTML (Hyper-Text Markup Language) file. XHTML and HTML files can be used to show a view on the screen 110, such as the travel itinerary form 200 of FIG. 2.

A solution, such as the solution 124, can also include various files or compilations of files, including a manifest file setting forth names and locations for files that are part of the solution 124. The files within the solution 124 can be packaged together, or can be separate. When separate, the list file 132 acts as a manifest of the files within the solution 124. In one implementation, the list file 132 can also include other information, such as definitions, design time information, data source references, and the like. In another implementation, file list information can be part of a manifest that stores the file list information. When the files are packaged together, the electronic forms application 122 can simply install and execute the packaged solution file for a particular data file. When not packaged, the electronic forms application 122 can read the list file 132, find the listed files, and install and execute each of the listed files for the particular data file.

Like solutions, data files can come in various types and styles. As mentioned above, data files can be written in XML or some other mark-up language, or can be written in other languages. Most data files, however, do not contain extensive logic and other files or code. One of the benefits of having data files separate from their solutions, is that it makes the data within them easier to mine. Because the data files are separate from their solution, the electronic forms application 122 makes them easy to open and edit by silently discovering and deploying the solution for the data file.

Data files also are typically concise and data-centered so that the data they contain can be more easily accessed or manipulated by multiple software applications, including software not typically used in a solution, such as an application that searches for a particular type of data and compiles that data into a report. A non-typical application, for example, could be one that compiles a report of all of the travel itineraries required to be mailed by a certain date by searching through and compiling the data entered into data files through the required data-entry field 206 of the travel itinerary form 200 electronic form.

The above devices and applications are merely representative, and other known devices and applications may be substituted for or added to those shown in FIG. 1. One example of another known device that can be substituted for those shown in FIG. 1 is the device shown in FIG. 11.

Figure 3:
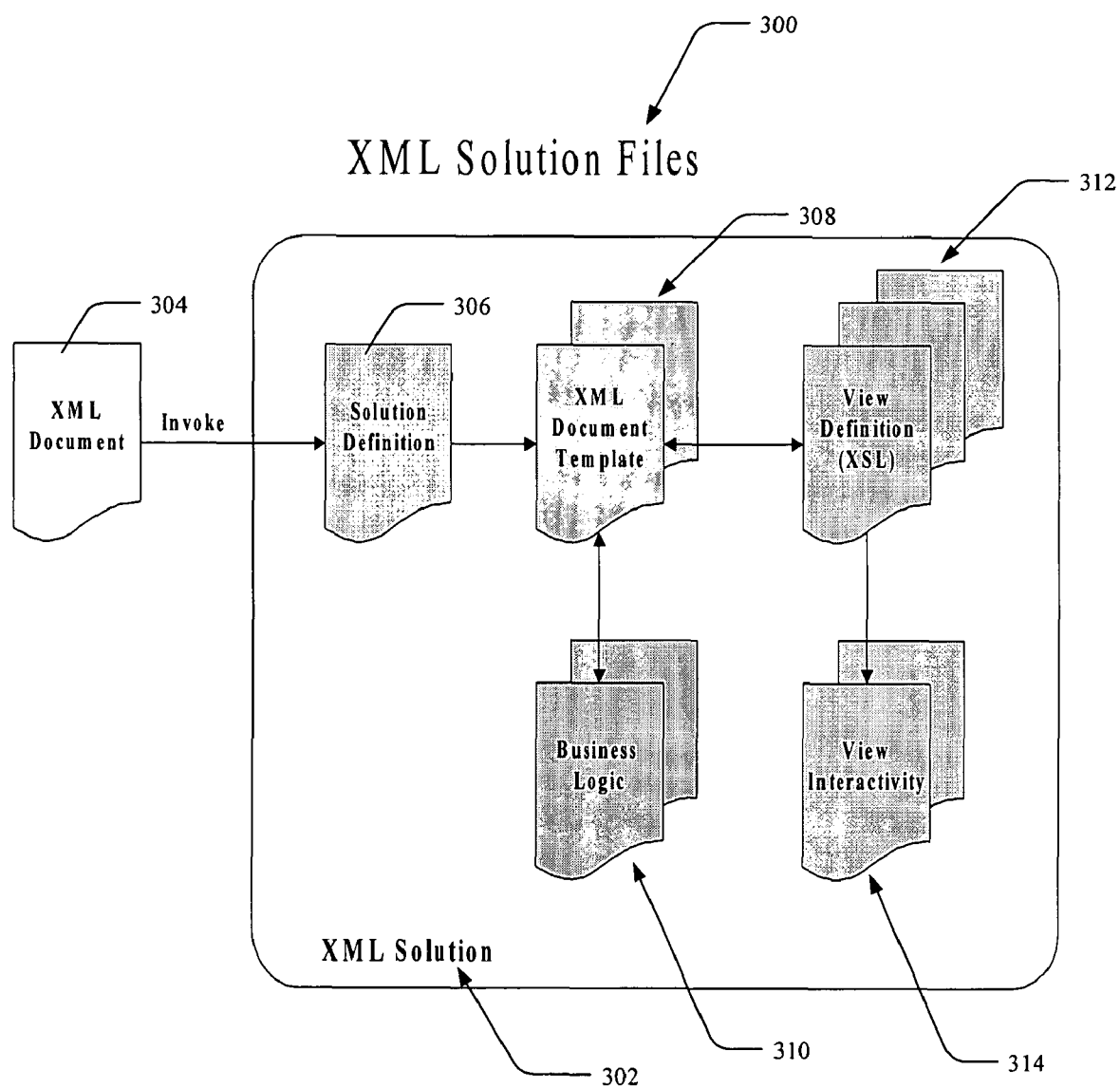
FIG. 3 illustrates a block diagram have components for an XML solution corresponding to an XML document.

FIG. 3 depicts a variety of components that can be used by the electronic forms application 122 described herein. The electronic forms application 122 allows a user to design, view and complete an electronic form. The electronic forms application 122 also allows the user to enter and change data in a data file corresponding to the electronic form, where the electronic form corresponds to the data file for which there is a corresponding solution.

A plurality of XML solution files 300, seen in FIG. 3, represent a collection of files that are used to implement an electronic form processed by implementation of the electronic forms application 122 described herein. File types can include HTML, XML, XSD, XSLT, script, and other file types that are necessary to support the functionality of the electronic form. As seen in FIG. 3, the XML solution files 300 include an XML solution 302 and an XML document 304. In general, however, XML documents can be keep separate from the XML solution 302. A solution definition file 306 is the "hub" of the electronic forms application 122. The solution definition file 306 contains a declarative definition of some solution features and a manifest of all the solution files including XML document templates 308, business logic files 310, view definition files 312, and view interactivity files 314. In a different implementation the view interactivity files 314 can be included with the solution definition 306. The XML document templates 308 are prototypes for each document type used in the electronic forms application 122. The XML document templates 308 are used to create new XML documents. Alternatively, an XML document template 308 can be a file that contains sample data that is displayed in the fields of an electronic form before a user fills out the electronic form. One of the XML Documents can be identified in the solution definition file 306 as a default document for the electronic forms application 122. The business logic files 310 contain validation information associated with a XML document type, which is discussed below with respect to FIGS. 9–10.

Having discussed general data files and solutions for viewing, editing, authoring general data files, above, a discussion will now be made specifically about XML documents and solutions. The view definition files 312 are XSLT files associated with each XML document 304. The view definition files 312 define multiple layouts and view logic for the XML document 304. The view interactivity files define a contextual user interface (UI) as well as behavior of some XSLT views. Each XSLT view is an electronic form-specific display setting that can be saved with an XML solution 302 and applied to form data when the electronic form is being filled out. Users can switch between views to choose the amount of data shown in the electronic form.

The XML solution files 308–314 are a collection of files that are used to implement an electronic form as further described herein. File types can include HTML, XML, XSD, XSLT, script, and other file types that are helpful in supporting the functionality of the electronic form.

The information (e.g., data) that is collected in a single electronic form, further described herein, can be used by many different systems and processes. The usefulness of this information is due the storage of the information as XML. The electronic forms application 122 can communicate with ADO (ActiveX Data Objects) databases and XML Web services in a bi-directional manner, enabling the information stored in databases and servers to populate data-entry fields within electronic forms.

The solution definition file 306 is described above as the hub file because it can contain all the information to determine how the XML document 304 is presented to the end-user for editing of the information and ways to interact with the information, such as by navigating to different views of the information, modifying content or creating new content, etc. The solution definition file 306 can reference secondary files, some of which have types of data corresponding to XML standards, like XSD files that are used for schema information, like XSLT files that are used to specify the direct visual presentation of the XML data as views, and like XSLT style-sheets that are used to transform the XML document that has been loaded into XHTML for visual presentation.

The solution definition file 306 uses XML vocabulary in an interoperable file format for XML solution 302. A declarative specification for contextual interactivity with XML data, via an XSL generated view, is included in the solution definition file 306. Additionally, the solution definition file 306 contains or references information about all other files and components used within a form, including files that contain instructions for user interface customizations, XML schemas, views, business logic, events, and deployment settings. Here, an event is an action recognized by an object, such as a mouse click or key press, for which a response by the electronic forms application 122 can be defined. An event can be caused by a user action or it can be triggered by the system. An event can be caused by a statement of business logic that is written in any supported programming language (e.g., a Visual Basic statement).

The solution definition file 306 is an XML document that can also express information that does not correspond to any XML standard via an XML syntax that allows declarative specification of XML solution 302. Various features can be provided to the end-user by the solution definition file 306.

Once feature that is provided by the solution definition file 306 is the ability to define views and commands/actions that can be made available via secondary user interface as well as how the views' availability will be determined contextually, including the interactivity that is to be made available in the views. Here, the secondary user interface (UI) referred to is a context driven UI that offers menus and toolbars.

Another feature provided by the solution definition file 306 is the types of binding between the views and the underlying XML data so that data entered can be saved in an XML file. The binding here refers to a logical connection from a control (e.g., a data entry field on an electronic form) to a field or group in a data source of an data file so that data entered into the control is saved. Here, a data source is a collection of fields and groups that define and store the data for an electronic form being processed with the electronic forms application 122. Controls in the form are bound to the fields and groups in the data source. Specifically, a control is a graphical user interface object, such as a text box, check box, scroll bar, or command button, that lets users control the electronic forms application 122. Controls can be used to display data or choices, perform an action, or make the user interface easier to read. Conversely, when a control is unbound, it is not connected to a field or group, and so data entered into the control will not be saved. A still further feature is the availability of structural or text-level editing operations on the XML data. Yet another feature includes validations (e.g., XML data validation), event handlers associated with the electronic form as a whole, and business logic associated to individual nodes of the XML Document Object Model (DOM) representing the form, where the business logic attaches to the electronic form as a whole, including the association of 'business logic' script with user actions. A still further feature includes simple workflow and information about routing of the XML Document 304. The availability to use global metadata information about the XML Document 304, including deployment/publishing information, is another feature. Another feature provided by the solution definition file 306 is the availability of default XML data that can be used when creating a new XML Document 304. A unique identifier for the electronic form is an other feature. A still further feature is the availability of optional schema for the XML DOM that comprises the electronic form.

The electronic forms application 122 described herein enables users to process XML documents 304. XML documents 304 are partitioned into classes or document types, based on their schemas. XML documents 304 need business logic 310 and data flow as required by the XML data solution 302 they are part of. This business logic 310 and data flow information lives outside of the XML document 304 in XML solutions 302. As such, the XML solution is a factory for given classes of XML Documents. The XML solution 302 defines the layouts and the editing behavior of the XML Documents 304. The XML solution 302 enforces data consistency and provides routing information. The electronic forms application 122 described herein may work with one or more types of XML documents 304 and provide a portal and a list views for collection of XML documents 304. XML solutions 302 can be stored on the client, such as in computer 112, and can be made available offline.

Figure 4:
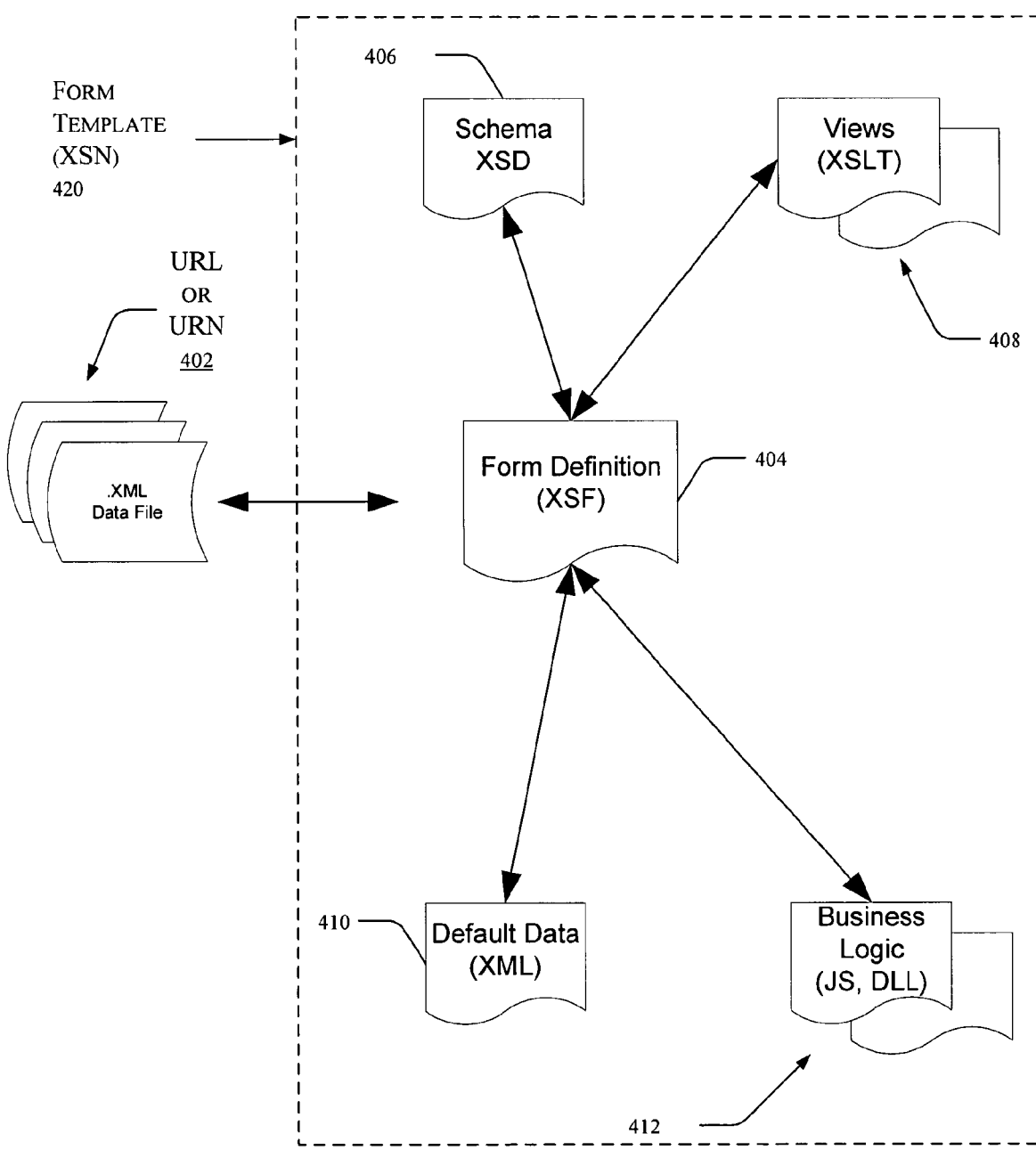
FIG. 4 is a block diagram that illustrates an exemplary collection of files that make up an electronic form template, where an application to use the electronic form template is invoked when a user navigates to an XML document.

FIG. 4 depicts an example of several files that make up or are referred to by an electronic form template 420. The electronic form template 420 can be a manifest of all files used by the electronic forms application 122 described herein. The electronic form template 420 can be invoked when a user navigates to an XML document or when a new XML document is to be created. The electronic form template 420 is a collection of files that declaratively defines the layout and functionality for an electronic form. Electronic form templates 420 can be stored either as a single compressed file or as a folder of files. This collection of files is required for any XML document to be opened and filled out in the electronic forms application 122. The electronic form template 420 includes an XML schema definition 406, a form definition 404, and one or more XSLT filed 408 for defining views.

The XML schema file 406 defines the structure for the XML created when filling out the electronic form. The one or more XSLT files 408 define different views. The definition of different views can be written in a language, such as XSLT, that is used to transform XML documents into other types of documents, such as HTML or XML. As used herein, XSLT is a style-sheet language that uses the XML syntax to specify transformation information for XML files. An XSL style-sheet specifies the presentation of a class of XML documents by describing how an instance of the class is transformed into an XML document that uses the formatting vocabulary. An XML file 410 can be used to determine the structure and content of a blank electronic form created with the form template. The XML file 404 (with an .xsf extension), which corresponds to the solution definition 306 seen in FIG. 3, defines much of the structured editing functionality behind the form template.

Optional auxiliary files 412 (e.g., Jscript or VBscript, graphics, XSLTs) define merge functionality, and/or other resources needed by the form template). An XML data file 402 corresponds to a URL or an URN for the purposes of reference with respect to the electronic form template 420. A collection of default data in XML file 410 is included in the electronic form template 420 and includes data for creating a new (e.g., blank) electronic form. One or more files of business logic 412, corresponding to business logic 310 seen in FIG. 3, can also be included in the electronic form template 420. The business logic 412 can be written in one or more languages including Java Script (JS) or languages used for components of a data link library (DLL). As seen in FIG. 4, each file in the form template 420 is referenced from and to the form definition 404.

As with HTML files, opening an .xml file in the Microsoft® Windows® operating system will automatically launch the application that created the file. If the Microsoft® Windows® operating system cannot detect the application that created the file, it will launch the file in the default application registered for the XML file extension. When an XML file is created or edited using the electronic forms application 122, the electronic forms application 122 creates an XML processing instruction (PI) at the beginning of that XML file, which indicates that the document should be edited specifically with the electronic forms application 122. Advantageously, the PI is part of the XML standard and does not interfere with the schema on which the XML file may be based. XML files generated by the electronic forms application 122 include the XML processing instruction that identifies the corresponding template using either a URL or a URN.

Figure 5:
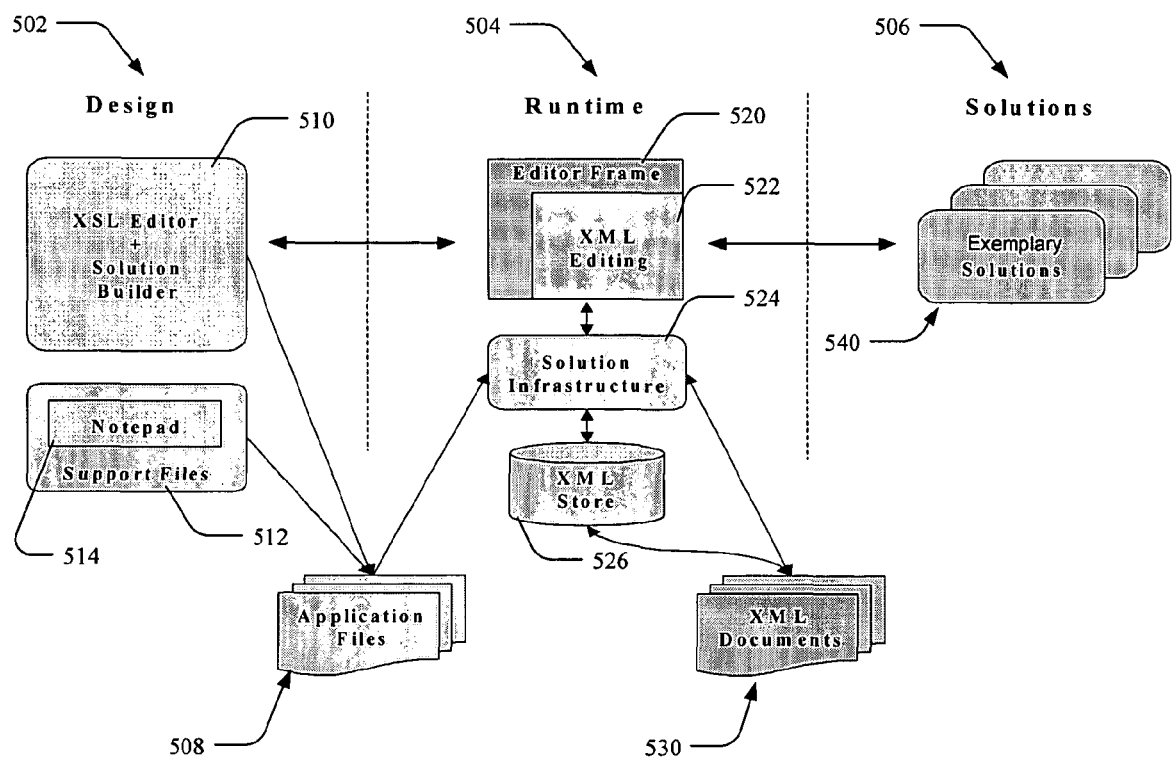
FIG. 5 is a flow diagram illustrating exemplary relationships between design components for an electronic form application, runtime components for using an electronic form designed using the design components, and solutions components that are preexisting electronic forms that can be used with the electronic form application.

FIG. 5 shows an exemplary architecture 500 for the electronic forms application 122 described herein. The architecture 500 includes a solution design component 502 for building a solution corresponding to a data file for which an electronic form can be used, an XML runtime component 504 to enter and view data in the electronic form, and a several exemplary XML solutions 506. Each of the components of the architecture 500 will now be discussed.

The solution design component 502 of the architecture 500, such as is seen at reference numeral 302 in FIG. 3, allows a solution to be built. The solution design component 502 provides a user interface (UI) to handle all the design requirements for common XML solutions. The result of the solution design component 502 is the set of files that represent the XML solution 302. The structure of the XML solution 302 in the electronic forms application 122 declaratively defines the output of the solution design component 502. Included in the solution design component 502 are an XSL editor and solution builder 510. Any script editor can be used to edit business logic script used in the electronic form. The supporting files 512 communicate with one or more application files 508 that are useful in building a solution for a data file.

In one implementation, the solution design component 502 provides a WYSIWYG forms designer and editor based on XML standards that can be used for generic XML schemas. As such, XSL editor and solution builder 510 need not be characterized as including an XML editor. Moreover, notepad 514 and support files 512 need not be present.

The runtime component 504 includes an editor frame 520 that includes XML editing 522. The XML editing 522 can function similarly to the electronic forms application 122. The editor frame 520 bidirectionally communicates with a solution infrastructure 524, such as XML solution 302 seen in FIG. 3. Each of the solution infrastructure 524 and the XML store 516 bidirectionally communicates with one of more XML documents 530. Additionally, the solution infrastructure 524 communicates with the one or more application files 508. As seen in FIG. 4, the XML document 304 points to the solution definition 306 that should process the XML document 304 on the computer 112. When the user uses the computer 112 to navigate to the XML document 304, the solution infrastructure 524 loads the required the solution definition 306. If needed, the solution definition 306 handles any contextual user interfaces (UI), runs business logic associated with the XML document 304 (e.g., business logic 310, 412), and enforces security for all computer 112 operations.

It is an option in some implementations that the XML solution infrastructure 524 works with the local XML store 526. The optional local XML store 526 can provide electronic mail (e-mail) capabilities, such as an "inbox" and a "sent items folder" for XML payloads, and to enable the ordering, filtering and aggregation of XML data that is shredded or parsed in the local XML store 526. Absent the foregoing option, XML store 526 can be omitted from XML runtime component 504.

The XML solution infrastructure 524 allows a user of computer 112 to access various XML data sources on computer 112, in an intranet, as well as on an extranet or the World Wide Web. Given the foregoing, XML Documents 530 can be displayed and edited using the XML Editing 522 of the editor frame 520.

The solutions 506 can be provided to a user of computer 112 as part of the architecture 500, where the user would like to see sample or exemplary solutions from which the user can learn about the electronic forms application 122. Solutions 506 can provide the user with a guide for customizing electronic forms and for building new solutions based on the exemplary solutions.

Figure 6A:
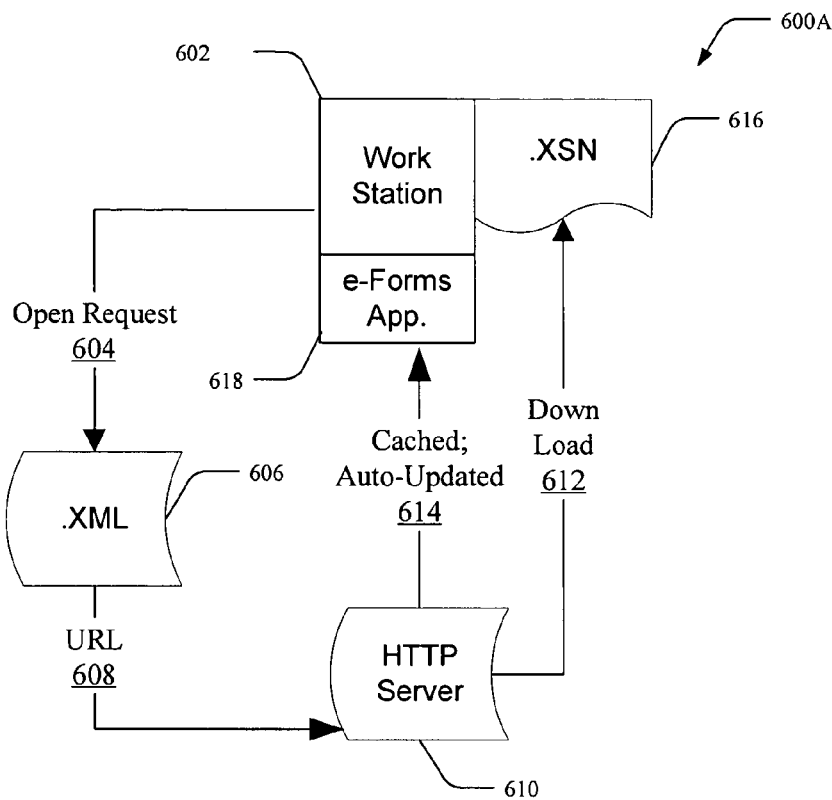
FIG. 6a is a flow diagram illustrating an exemplary process to deploy a form template in which a user opens a form of a certain type to automatically download the corresponding latest version of a form template that is stored on the user's machine so that the user can use the form template when not connected to a network.
Figure 6B:
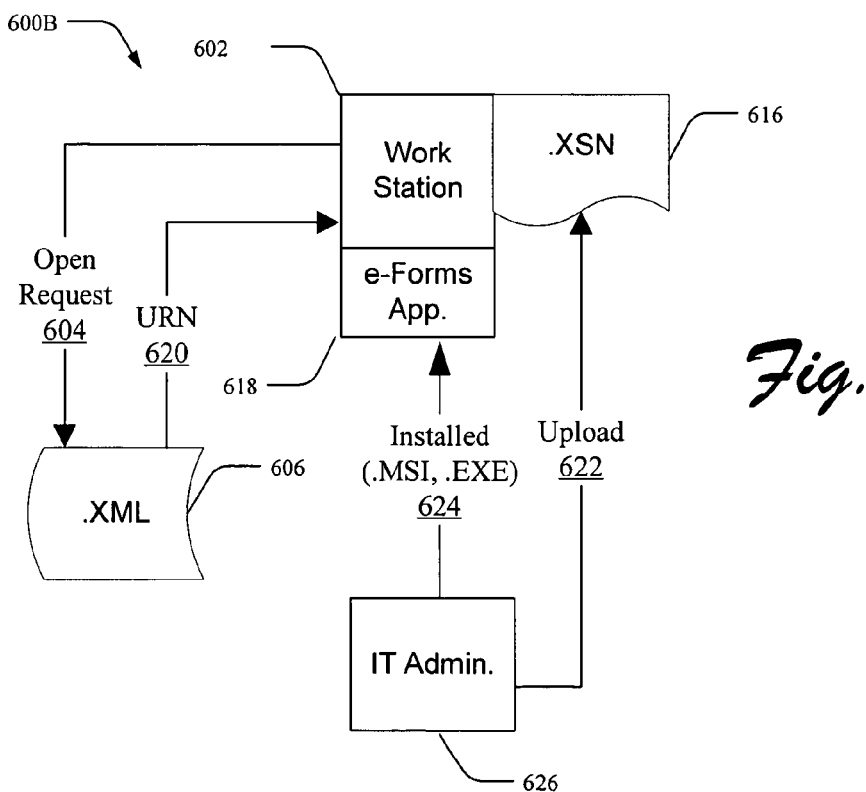
FIG. 6b is a flow diagram illustrating an exemplary process to deploy a form template by installation directly on a user's computing device, where the form template can be packaged as an executable module.

FIGS. 6a and 6b provide respective processes 600A, 600B by which a user of workstation 602 can be provided with a solution having a corresponding electronic form that can be used by a user via an electronic forms application 618. The electronic forms application 618 and the workstation 602 seen in FIGS. 6a–6b can be similar to the electronic forms application 122 and the computer 112, respectively, as seen in FIG. 1. For instance, one of the form templates 420 seen in FIG. 4 can be deployed to workstation 602 so that the user of workstation 602 can fill out the electronic form that corresponds to the form template 420. As discussed with respect to FIG. 4, the form template 420 includes the XML schema that is to be used, the formatting or presentation of the electronic form, and any logic that the electronic form uses. The deployment of the form template 420 is available by process 600A and process 600B.

In process 600A, seen in FIG. 6a, the form template 420 is deployed to a HTTP server 610 (e.g., a Web Server). This deployment of the form template 420 enables a transparent web deployment and maintenance model. Specifically, at block 602 of FIG. 6A, a user opens a form of a certain type for the first time via an open request 604 for an XML document 606 using a URL 608 for the corresponding solution. The previously stored corresponding form template 420 is deployed from HTTP server 610 at process flow 614. The deployed form template 420 is automatically downloaded on a network and stored as an "*.XSN" file on the workstation 602 being used by the user. The downloaded form template 420 allows the user to use the form template 420 even when the workstation 602 is not connected to the network. Assuming the user has network connectivity, whenever the user opens a form, the electronic forms application 618 can be configured to check to see if a newer version of the corresponding form template 420 is available at process flow 614. If so, the newer version can be automatically downloaded to and stored on the users' workstation 602 at process flow 614.

Process 600B, seen in FIG. 6b, is an alternative to process 600A in that the form template 420 can be deployed by process flow 624 directly to workstation 602 from an information technology administrator 626 in such a way that the form template 420 will have access to local system resources and/or applications. In this case, the deployed form template 420 can be packaged for execution via process flow 624 (e.g., a "*.exe" or "*.msi" file). As seen in FIG. 6b, the workstation 602 navigates to an XML file 606 and issues an open file request at process flow 604. A URN is returned to workstation 602 at process flow 620. Here, for instance, the form template 20 can access a directory service to obtain a users' role in an organization, where users are required to be at a certain management level to approve an electronic form, such as a travel itinerary, a purchase order or other document used in the ordinary course of business. Once obtained, the electronic forms application 618 can use this information to execute the appropriate business logic for the purchase order. The form template 420 may be deployed, for instance, along with other client code as part of a larger client deployment scenario.

Techniques for Silent Discovery and Deployment of a Solution for a Data File

Overview

FIG. 7 shows a process 700 for silently discovering and deploying a data file's solution. The process 700 is illustrated as a series of blocks representing individual operations or acts performed by the architecture 100. The process 700 may be implemented in any suitable hardware, software, firmware, or combination thereof. In the case of software and firmware, the process 700 represents a set of operations implemented as computer-executable instructions stored in memory and executable by one or more processors.

Silent Discovery and Deployment

At block 702, the system 102 receives input from a user to open the data file 126. The user may simply click on an icon representing the data file 126 or otherwise select the data file 126 after which the system 102 opens the data file 126.

At block 704, the system 102 discovers a solution identifier in the selected data file 126. This assumes that the data file 126 is one in which the electronic forms application 122 is capable of reading. The electronic forms application 122 can read data files created at some previous time by the user's or another's electronic forms application 122. In one implementation, the electronic forms application 122 can also read the data file 126 if it is created by another application that builds a solution identifier into the data file 126. This solution identifier can give the system 102 an original source for the solution 124. The solution identifier is typically a URL (Uniform Resource Locator) or URN (Uniform Resource Name), but can include other types of names and/or locators. URLs give locations and URNs names of resources, such as the solution 124, which are typically accessible through the communications network 104. With the solution identifier, the system 102 can determine the original source for the solution 124 (where it first came from) and whether or not the system 102 has seen the solution 124 before.

In one implementation, the solution identifier is part of a processing instruction included within the data file 126. This processing instruction is often part of data files and can include various instructions to host applications, such as the electronic forms application 122. Processing instructions, while not strictly data, do not rise to the level of an applet or application typically included in a solution 124 for a data file 126. For data files written in XML, for instance, the processing instructions are usually not written in XML, but rather are just a piece of information commonly included. A processing instruction in an XML data file can look like "<?mso-eFormSolutionVersion="99.9"PIVersion="99.1"href="http://insidewebsite/Forms/template.xsn" ?>".

This processing instruction gives the electronic forms application 122 a solution identifier, which here gives the original source for the solution 124 for the data file 126. This solution identifier includes a URL indicating that the original location for the solution 124 is at a remote server accessible by accessing the communications network 104 through the network interface 118.

One of the advantages of the electronic forms application 122 is that it enables a user to open the data file 126 without the user needing to discover the data file's solution 124, install the solution 124, or even know that the solution 124 exists. This system and method enables users to open data files simply and easily and in many cases enables them to edit a data file offline that they would otherwise not have been able to edit.

With the solution identifier, the system 102 computes a special name for the solution 124 (block 706). This special name is designed to be a name easily found only by the electronic forms application 122. The special name, because it is computed and findable by the electronic forms application 122 but is not intended to be discoverable by other applications, allows for greater security in downloading possibly hostile solutions from the communications network 104.

In one implementation, the electronic forms application 122 takes the solution identifier and computes a unique special name for the solution identifier. This unique special name is repeatable; the next time the electronic forms application 122 computes a unique special name for the same solution identifier, the same unique special name will be created. By so doing, the electronic forms application 122 can find a previously downloaded solution by computing the unique, special name and then searching for the unique, special name to determine if the solution is available locally for offline use (such as by having the solution stored in the memory 116).

In another implementation, the electronic forms application 122 computes a unique special name by computing a hash, such as a Message Digest 5 hash (MD5 hash), of the solution identifier. By computing a one-way hash of the solution identifier, the electronic forms application 122 creates a unique, special name that is a file of 128 bits from the digits of the solution identifier. Because the file of the unique, special name is 128 bits long, it is very difficult for another application, such as one designed to damage a computer or its files, to determine if the solution 124 is on the computer (cached or available offline) and access the solution 124. With this hash-based special name, the electronic forms application 122 provides additional security for the system 102.

The system 102 uses the special name, which corresponds to a solution identifier and thus the data file 126's solution 124, to search through locally accessible sources for the solution 124 (block 708). The system 102 may, for instance, search in the memory 116 of FIG. 1 for files and/or folders with the same name as the special name computed in the block 706.

When the Special Name is Found

If the system 102 finds the special name (i.e., the "Yes" branch from block 710), then the solution 124 was saved earlier in the system 102 that was searched locally in the block 708. Thus, when the special name is found, the system 102 knows that the solution 124 referred to in the data file 126 (which the user is attempting to open) is accessible offline by the system 102. The solution 124 is usually stored in the memory 116 but can be stored in other searchable, local sources that the system 102 does not have to go online to find.

The solution 124, stored at the source and found using the special name, may not be current, however. Because of this, the system 102 determines whether or not the system 102 is online or offline (block 712). If online (i.e., the "Yes" branch from block 712), the system 102 will attempt to determine whether or not a more up-to-date solution should be installed (discussed below). If offline and if the locally stored solution 124 is new, then the system 102 will proceed to install the locally stored solution 124 (block 714). If system 102 is offline and the solution 124 is not new, then process 700 will terminate in a failure mode.

If the Solution is Found and the System is Offline

If the solution 124 is found and the system 102 is offline, the system 102 proceeds to install the solution 124 from the memory 116 or another locally accessible source (block 714).

The system 102 installs the solution 124 silently in that the user does not need to know that the solution 124 was discovered, found, or being installed. Thus, the system 102 enables a user to edit the data file 126 when offline by silently discovering and deploying the data file's solution 124.

In one implementation, the system 102 installs the solution 124 and then opens the data file 126 in such a manner as to mimic how the data file 126 would be opened had the user opened the data file 126 with the solution accessible online, such as through opening the data file 126 with Microsoft® Internet Explorer®. The system 102 does so to make opening and editing the data file 126 as comfortable for the user as possible, because many users are familiar with opening data files online. One possible difference, however, is that if the system 102 has a slow connection to the communications network 104, the electronic forms application 122, by installing the solution 124 from a local source like the memory 116, may more quickly open the data file 126 than if the user were online.

In block 716, the system 102 opens the data file 126 to enable the user to edit the data file 126. One example of an opened data file (and solution) enabling edits is the travel itinerary form 200 of FIG. 2. In this example, the user is able to edit the data file 126 by adding, deleting, or changing data in data entry fields (like the data-entry field 206 even though offline.

Following the previous blocks, a user can easily open a data file offline without having to discover or deploy the data file's solution. This enables users, for example, after first opening a solution online, to open a data file offline. A user can open a data file online and edit it by adding a date through the data-entry field 202 of the travel itinerary form 200 and then stop editing the data file (the data file would contain the added date by the system 102 adding the date to the data file). The user could then go offline, such as by taking his or her laptop on a business trip, and complete filling out the electronic form. Or the user could send the partially filled-out data file to another user to fill out the rest of the electronic form, which the other user could do so long as the other user's system contains a stored solution. This flexibility allows users and businesses a greater ability to use information by keeping data and solutions separate and by allowing offline use of data files.

If the Solution is Found and the System is Online

Assuming the system 102 finds the special name and the system is online, the system 102 will attempt to determine whether the current solution is the most recent version or a more up-to-date solution is available. In block 718, the system 102 compares the time stamp of the stored solution 124 and the online solution. Since the system 102 is online, it can access the solution (here we assume that the original origin of the solution 124 is from an online source). If the solution identifier from the data file 126 selected by the user contains a reference to the solution 124 being accessible online, the system 102 goes online to check whether or not the online solution is newer than the stored solution 124 (block 720). In one implementation, the system 102 compares a time stamp of the online solution with a time stamp on the stored solution 124.

If the online solution is not newer (i.e., the "No" branch from block 720), the system 102 proceeds to the block 714, installing the stored solution 124. If the online solution is newer than the stored solution 124 (i.e., the "Yes" branch from block 720), the system 102 either replaces the stored solution 124 with the online solution or otherwise updates the older, stored solution 124.

Downloading the Solution for Later Use

In block 722, the architecture 100 (or the system 102 by accessing the communications network 104) downloads a solution into a locally accessible source such as the memory 116. The system 102 downloads this solution when the data file 126 selected by a user contains a solution identifier for a solution for which the system 102 does not have local access (such as it not being cached) or for which the system 102 has local access but the cached or stored version of the solution (the solution 124) is older than the online version.

In either case, the system 102 has already discovered the solution identifier for the solution and computed a special name for the solution. The system 102 then downloads the solution from the online source. Note, however, that if system 102 is offline, then, then process 700 will terminate in a failure mode. If system 102 is online, then process 700 proceeds from block 722 to block 724 and saves the solution into a folder named with the special name (block 724). If a solution already exists in that folder, the system 102 replaces it with the newer version or otherwise updates the currently cached solution. The resulting new or updated version will then be in the solution 124.

In one implementation, the system 102 saves the solution to a unique location within the system 102's accessible memory. The system 102 does so in cases where the system 102 is used by multiple users. By so doing, the system 102 is able to determine which of the users that use the system 102 or load files into memory locally accessible by the system 102 saved the particular solution. Also by so doing, the system 102 may provide greater security for the computer 112 and its users.

Data Files, Transformation Files, Rendering Files, and Rendered Forms

As discussed above, solution 124 contains presentation folder 128 that includes the rendering file 128a and the transformation file 128b. The data file 126, transformation file 128a, rendering file 128b, and a rendered form work together to allow a user to edit the data file 126. A user can input data into and view data in the data file 126 through the rendered form of the data file. This rendered form is the result of executing the rendering file 128a, which is created by applying the transformation file 128b on the data file 126.

Figure 8:
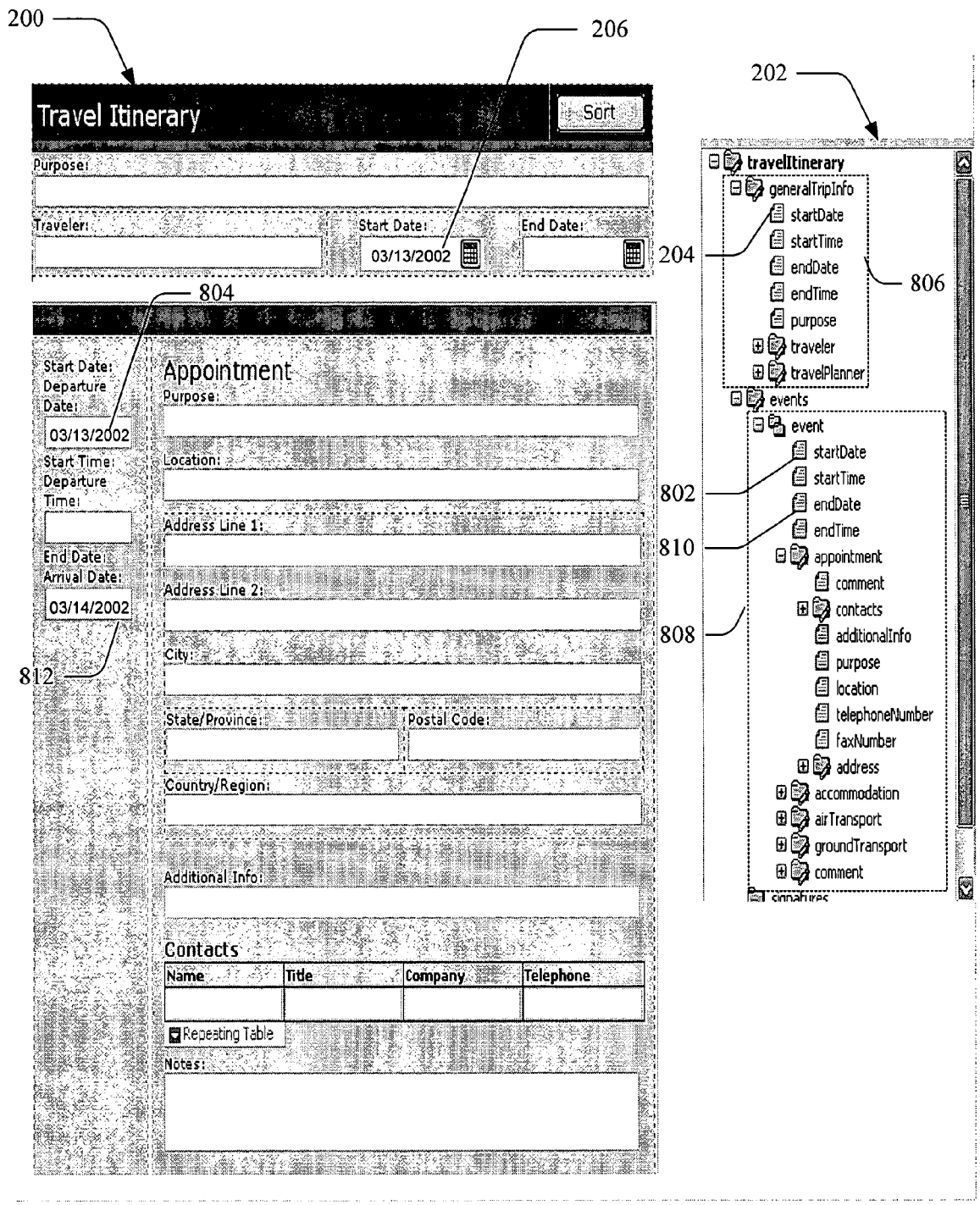
FIG. 8 illustrates the exemplary screen display depicting the electronic form seen in of FIG. 2, where data has been entered into a plurality of data-entry fields of the electronic form.

FIGS. 2 and 8 shows the rendered form 200 entitled "Travel Itinerary", which is generated by executing the rendering file 128a. This travel itinerary form 200 is rendered so as to contain data-entry fields in which a user can enter data. These data-entry fields map to the data file 126, so that the data entered into the form are retained in the data file 126.

Data input into a particular data-entry field of the rendered form is stored in a particular node of the data file 126. Data-entry fields of the rendered form correlate to nodes of the data file 126 in part because the rendered form is the result of the transformation file 128b being applied on the data file 126. The system 102 can use various ways to detect which data-entry fields correlate to which nodes of the data file 126, including through mapping with XML Path Language (XPath) expressions that address parts of data file 126 (e.g., an XML document) by providing basic facilities for manipulation of strings, numbers and Booleans.

Also in FIGS. 2 and 8, a graphical representation of the data file 126 is shown as a data file tree 202. The data file tree 202 shows icons representing nodes of the data file 126. Many of these nodes correlate to data-entry fields shown in the travel itinerary form 200 that is rendered. For instance, a trip start date node 204 correlates to the trip start date data-entry field 206. Thus, data entered by a user into the trip start date data-entry field 206 can be stored in the trip start date node 204 of the data file 126.

The transformation file 128b also correlates to the data file 126. Nodes of the data file 126 correlate to particular parts of the transformation file 128b, also called nodes for the purposes of this description. Thus, nodes of the transformation file 128b correlate to nodes of the data file 126. This correlation can arise from nodes of the transformation file 128b being mapped to the nodes of the data file 126, including through XPath expressions, or otherwise.

That certain nodes of the transformation file 128b correlate to certain nodes of the data file 126 is often not enough, however, for the system 102 to accurately reflect a change in a particular node of the data file 126 by simply applying only a particular node of the transformation file 128b on a particular node of the data file 126. A node of the transformation file 128b, when applied on a node of the data file 126, may affect many nodes of the data file 126. A node of the transformation file 128b could, for instance, be one that, as part of being applied on a node of the data file 126, is also applied on previously filled-in or as-yet-unfilled-in nodes of the data file 126. This concept is illustrated in FIG. 8.

FIG. 8 shows the travel itinerary form 200 that has been rendered, in this case including filled-in data-entry fields. Here the rendered form is generated after data was input by a user into the trip start date data-entry field 206, "03/13/2002". After the electronic forms application 122 produced a rendering file, the system 102 renders the rendering file. In this example, the transformation file 128b, when applied, affected other nodes of the data-entry field other than just the trip start date node 204, in this case an event start date node 802. Because the transformation file 128b (or a part thereof) affected the event start date node 802, the rendering file 128a included that change. Thus, when executed, the rendering file 128a renders an updated travel itinerary form 200, including the data shown in an event start date data-entry field 804 in FIG. 8. Here, the transformation file 128b altered the event start date node 802 to include the exact same data entered into the trip start date data-entry field 206 of FIG. 8. The transformation file 128b may perform such an action to make it easier for the user in cases where a future node/data-entry field is likely to have the same data.

Further, the node of the transformation file 128b may direct the system to perform computations or other operations using other resources, like a database. For these and other reasons, the electronic forms application 122 analyzes the results of nodes of the transformation file 128b being applied on nodes of the data file 126 or nodes of some hypothetical data file, which will be discussed in greater detail below.

In some implementations, the transformation file 128b is an XSLT (eXtensible Style-sheet Language Transformation) file, which, when applied to an XML data file 126, generates a XHTML (eXtensible Hyper-Text Machine Language) or HTML (Hyper-Text Machine Language) rendering file (such as the rendering file 128a). The transformation file 128b can also be an arbitrary XSLT file, such as a custom-made file or some other W3C-compliant file. XHTML and HTML files can be used to show a view on the screen 110, such as the travel itinerary form 200 of FIGS. 2 and 8.

Like transformation files, data files can come in various types and styles. Hierarchical data files can be written in XML or some other mark-up language, or can be written in other hierarchical languages. Hierarchical data files also are typically concise and data-centered so that the data they contain can be more easily accessed or manipulated by multiple software applications, including software not typically used in a solution, such as an application that searches for a particular type of data and compiles that data into a report. A non-typical application, for example, could be one that compiles a report of all of the travel itineraries filled out in electronic forms by a certain person by searching through and compiling the data entered in travel itinerary data files for a particular person.

Validating Data from a User in Real-Time

Overview

A system, such as the system 102 of FIG. 1, displays an electronic form with data-entry fields to allow a user to enter data. The user can enter data in a data-entry field and know, as he does so, whether or not the data entered is valid or invalid. By so doing, the system 102 provides an easy, intuitive, and efficient way for a user to enter and correct data intended for a structured data file.

Figure 9:
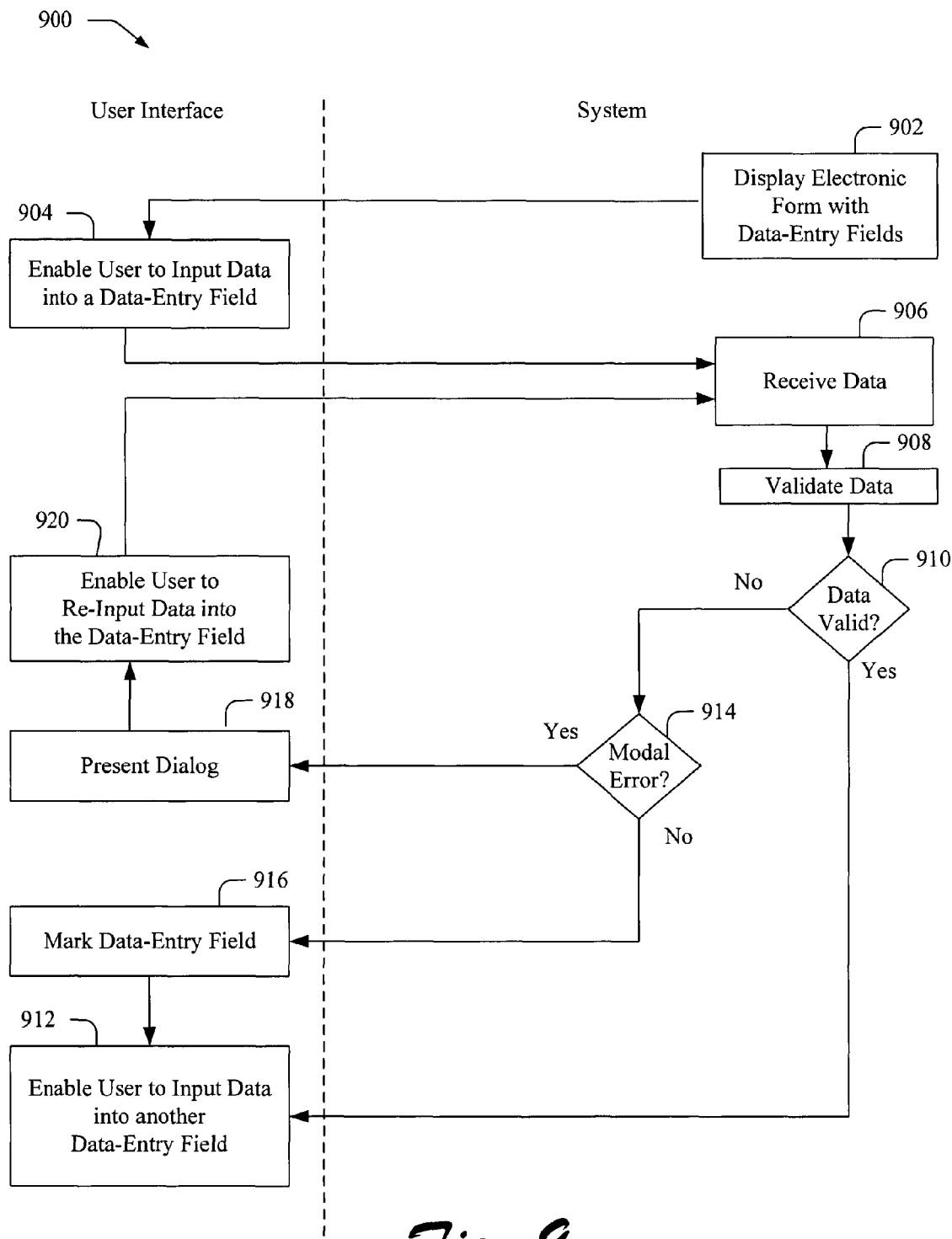
FIG. 9 is a flow diagram of an exemplary process for real-time validation of data for a data file.

FIG. 9 shows a process 900 for validating data entered into an electronic form in real-time. The process 900 is illustrated as a series of blocks representing individual operations or acts performed by the system 102. The process 900 may be implemented in any suitable hardware, software, firmware, or combination thereof. In the case of software and firmware, the process 900 represents a set of operations implemented as computer-executable instructions stored in memory and executable by one or more processors.

Notifying a User of Errors in Real-Time

Figure 10:
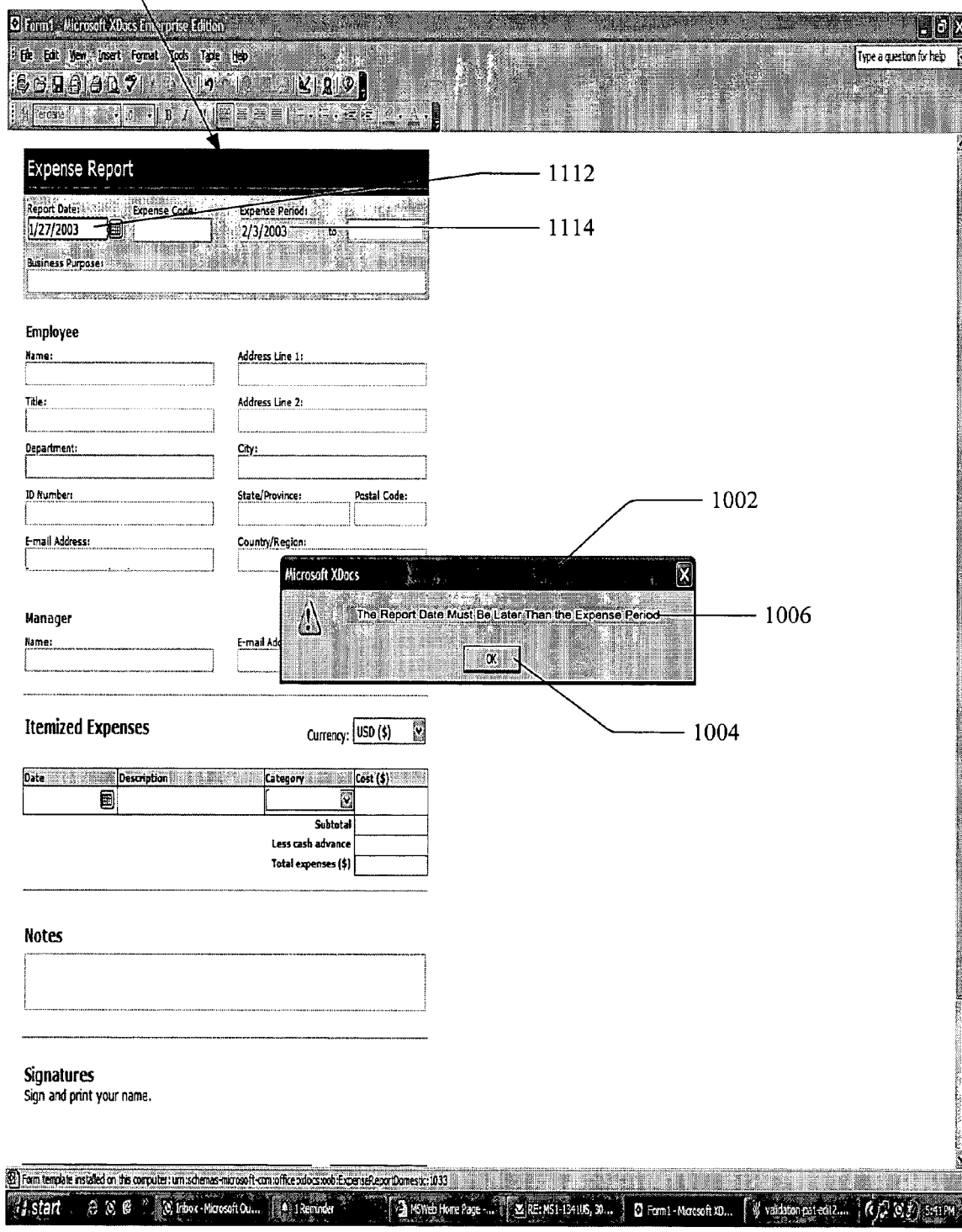
FIG. 10 illustrates an exemplary screen display showing an electronic form with a data-entry field having an invalid entry and a dialog box.

At block 902, the system 102 displays an electronic form having data-entry fields. The electronic form can be blank or contain filled data-entry fields. The expense report 1010 electronic form in FIG. 10 is an example of an electronic form that contains data in data-entry fields.

The system 102 displays an electronic form in a manner aimed at making a user comfortable with editing the electronic form. It can do so by presenting the electronic form with user-friendly features like those used in popular word-processing programs, such as Microsoft® Word®. Certain features, like undoing previous entries on command, advancing from one data-entry field to another by clicking on the data-entry field or tabbing from the prior data-entry field, cut-and-paste abilities, and similar features are included to enhance a user's data-entry experience. For example, the system 102 displays an electronic form having some of these features in FIG. 10, the expense report 1010 electronic form.

At block 904, with the electronic form presented to the user, the system 102 enables the user to input data into a data-entry field. The user can type in data, cut-and-paste it from another source, and otherwise enter data into the fields. The user can use the user-input devices 106, including a keyboard 110 and other device(s) (such as a touch screen, track ball, voice-activation, and the like). In FIG. 10, for example, the user enters "1/27/2002" into the report date data-entry field 1012 of the expense report 1010.

At block 906, the system 102 receives the data entered into the data-entry field 1012 by the user. The system 102 receives the data from the user through the user-input devices 106 and the user interface 134 (both of FIG. 1). The system 102 can receive the data character-by-character, when the data-entry field is full, or when the user attempts to continue, such as by tabbing to move to another data-entry field. In the foregoing example, the system 102 receives "1/27/2002" from the user when the user attempts to advance to the next data-entry field.

At block 908, the system 102 validates the data received into the data-entry field in the electronic form. By using validation rules stored in the logic file 130 of the solution 124 and a real-time validation tool 136 stored in memory 116, the system 102 can analyze the data to determine if it is valid. In an alternative implementation, the real-time validation tool 136 can be included as a part of the solution 124 in memory 116. The real-time validation tool 136 refers to the validation rules, if any, in the logic file 120 governing that particular data-entry field (in this example the report date data-entry field 1012). The real-time validation tool 136 validates the data entered into a data-entry field without the user having to save or submit the electronic form. It can do so by applying validation rules associated with the node of the structured data file corresponding to data-entry field into which the data was entered.

The real-time validation tool 136 can apply validation rules from many different sources. One source for validation rules is a schema governing the structured data file. Other sources of validation rules can include preset and script-based custom validation rules.

For script-based custom validation rules, the real-time validation tool 136 enables these rules to refer to multiple nodes in a structured data file, including nodes governing or governed by other nodes. Thus, the real-time validation tool 136 can validate data from a data-entry field intended for a particular node by checking validation rules associated with that particular node. Through so doing, the real-time validation tool 136 can validate data entered into one node of a group with the validation rules governing the group of which the node is a part.

For example, if a group of nodes contains four nodes, and is associated with a script-based validation rule requiring that the total for the data in all of the four nodes not exceed 1000, the real-time validation tool 136 can validate each node against this rule. Thus, if the first node contains 100, the second 400, and the third 300, the real-time validation tool 136 will find the data intended for the fourth node invalid if it is greater than 200 (because 100+400+300+200=1000).

In some cases the real-time validation tool 136 can build validation rules from a schema containing logic that governs a structured data file. This logic sets forth the bounds of what data nodes in a structured data file can contain, or the structure the nodes should have. Data entered into a structured data file can violate this logic, making the structured data file invalid. This invalid data may cause a structural error or a data-type error in the structured data file, possibly making the structured data file useless. To combat this, the real-time validation tool 136 can build validation rules from a structured data file's schema.

Because structural errors are especially important, the real-time validation tool 136 treats these types of errors seriously. To make sure that a user treats these errors seriously, the real-time validation tool 136 builds validation rules for structural errors that stop a user from continuing to edit an electronic form if the real-time validation tool 136 detects a structural error. Validation rules that stop the user from continuing to edit the electronic form (except for fixing that invalid data) are called modal validation rules, and errors that violate them, modal errors.

For less serious errors, such as data-type errors, the real-time validation tool 136 builds validation rules that do not stop the user from continuing. These are called modeless validation rules, and errors that violate them, modeless errors.

To aid the real-time validation tool 136 in validating data in real-time, validation rules are associated with particular nodes. By so doing, with each new piece of data received, the real-time validation tool 136 is capable of comparing the data received against an appropriate list of validation rules associated with the node for which the data received is intended. Because this list of validation rules can be very short for each particular node, the real-time validation tool 136 has fewer validation rules to check for each piece of data entered than if it had to check all the validation rules for the node's structured data file. This speeds up the process of validation.

Continuing the previous example, at the block 908 the system 102 validates the data entered, "1/27/2002", against validation rules associated with the report date data-entry field 1012, thereby determining if the data entered is valid.

In block 910 the system 102 determines whether to proceed to block 914 or 912 depending on whether the data is valid. If the real-time validation tool 136 determines that the data entered is not valid, it proceeds to the block 914, discussed below. If, on the other hand, the real-time validation tool 136 determines it to be valid, the system 102 continues to block 912, allowing the user to continue editing the electronic form. Continuing the ongoing example, if the real-time validation tool 136 determines that the data "1/27/2002" is valid, the system 102 continues on to the block 912. If not, it proceeds to block 914.

At the block 912, the system 102 enables the user to input data into another data-entry field. In FIG. 10, for example, it would allow the user to proceed to enter data into the expense period data-entry field 1014 after the data entered into the report date data-entry field 1012 was determined to be valid. The system 102 can allow the user to proceed to another data-entry field as well, depending on the user's preference.

If the data is invalid, the system 102 proceeds to the block 914. At the block 914 the system 102, through the real-time validation tool 136, determines whether to proceed to block 916 if the error is not modal and 1018 if it is.

Continuing the previous example, assume that the data entered into the report date data-entry field 1012 is invalid. Assume also that "1/27/2002" is not defined to be a modal error. (Modal errors are those for which the real-time validation tool 136 rolls back the invalid entry requiring the user to re-enter another entry before continuing on to edit another data-entry field or requires the user to correct.) Thus, in this example, "1/27/2002", is invalid, but is a modeless error.

In the block 916, the real-time validation tool 136 alerts the user of a modeless error by marking the data-entry field as containing an error, but allows the user to continue editing the electronic form. To make the editing process as easy, intuitive, and efficient as possible, the real-time validation tool 136 can mark the data-entry field from which the invalid error was entered in many helpful ways. Optionally, or in combination with the foregoing, a prompt or diagnostic can be displayed. The real-time validation tool 136 can highlight the error in the data-entry field, including with a red box, a dashed red box, a colored underline, a squiggly underline, shading, and the like. The real-time validation tool 136 can also alert the user with a dialog box in a pop-up window, either automatically or only if the user asks for information about the error.

The real-time validation tool 136, for example, can present a dialog box or other presentation manner explaining the error or what type of data is required by the data-entry field. The real-time validation tool 136 can present a short comment that disappears quickly or is only shown if the user moves his cursor or mouse pointer over the data-entry field. The real-time validation tool 136 can also provide additional information on request. Many manners of showing the user that the data is invalid as well as showing information about the error can be used. These ways of notifying the user can be chosen by a developer when creating a custom validation rule. For modeless errors, the real-time validation tool 136 permits the user to proceed, according to the block 912, discussed above. For modal errors, however, the real-time validation tool 136 can present a dialog (block 918). The user then can dismiss the dialog. Once the dialog is dismissed, the real-time validation tool 136 rolls back the invalid entry and enables the user to continue editing the electronic form. This editing can include re-inputting data into the data-entry field (block 920), or editing another data-entry field. Alternatively, the real-time validation tool 136 leaves the error in the document, but will not allow the user to continue editing the document without first correcting the error.

In the block 918, the real-time validation tool 136 presents an alert to notify the user of the invalid entry. This alert is intended to inform the user that the error is important and must be fixed. The alert does not have to be a pop-up window, but should be obvious enough to provide the user with an easy-to-notice notification that the user has entered data causing an error. The alert, in one implementation, is a pop-up window that requires the user to pause in editing the electronic form by making the user click on an "OK" button in the alert. This stops the user mentally, helping the user to notice that he must fix the data-entry field having the error before proceeding. The alert can contain no, little, or extensive information about the error. The information can be presented automatically or after the system 102 receives a request for the information.

FIG. 10 shows the partially filled-in expense report 1010 electronic form with a date dialog box 1002 in an alert area display and arising from invalid data causing a modal error. The dialog box contains a button marked "OK" that the user must select (a date dialog button 1004). The date dialog box 1012 also contains a date information line 1006 informing the user about the error, "The Report Date Must Be Later Than the Expense Period." This information is intended to aid the user's attempt to correct the invalid data.

After presenting the user with some sort of alert in block 918 (FIG. 9), the real-time validation tool 136 enables the user to re-input data into the data-entry field containing the modal error (block 920). Here the user must change the data within the data-entry field to a valid or modeless error before continuing to edit new data-entry fields in the electronic form. Once the user inputs new (or the same) data into the data-entry field, the system 102 receives the data at the block 906 and so forth. To proceed, the user must enter data that is not a modal error; if the user does not, the system 102 will follow the process 900, continuing to find the data modally invalid and not permit the user to continue.

Through this process 900 of FIG. 9, the system 102 can receive and validate data in real-time. By so doing, a user can easily, accurately, and efficiently edit a structured data file through entry of data into data-entry fields in an electronic form.

The example set forth in FIG. 9 is not intended to be limiting on the abilities of the system 102 or the real-time validation tool 136. Other types of forms, data-entry fields, and alerts can be used.

The above devices and applications are merely representative, and other known devices and applications may be substituted for or added to those shown in FIG. 1. One example of another known device that can be substituted for those shown in FIG. 1 is the device shown in FIG. 11.

Exemplary Computing System and Environment.

Figure 11:
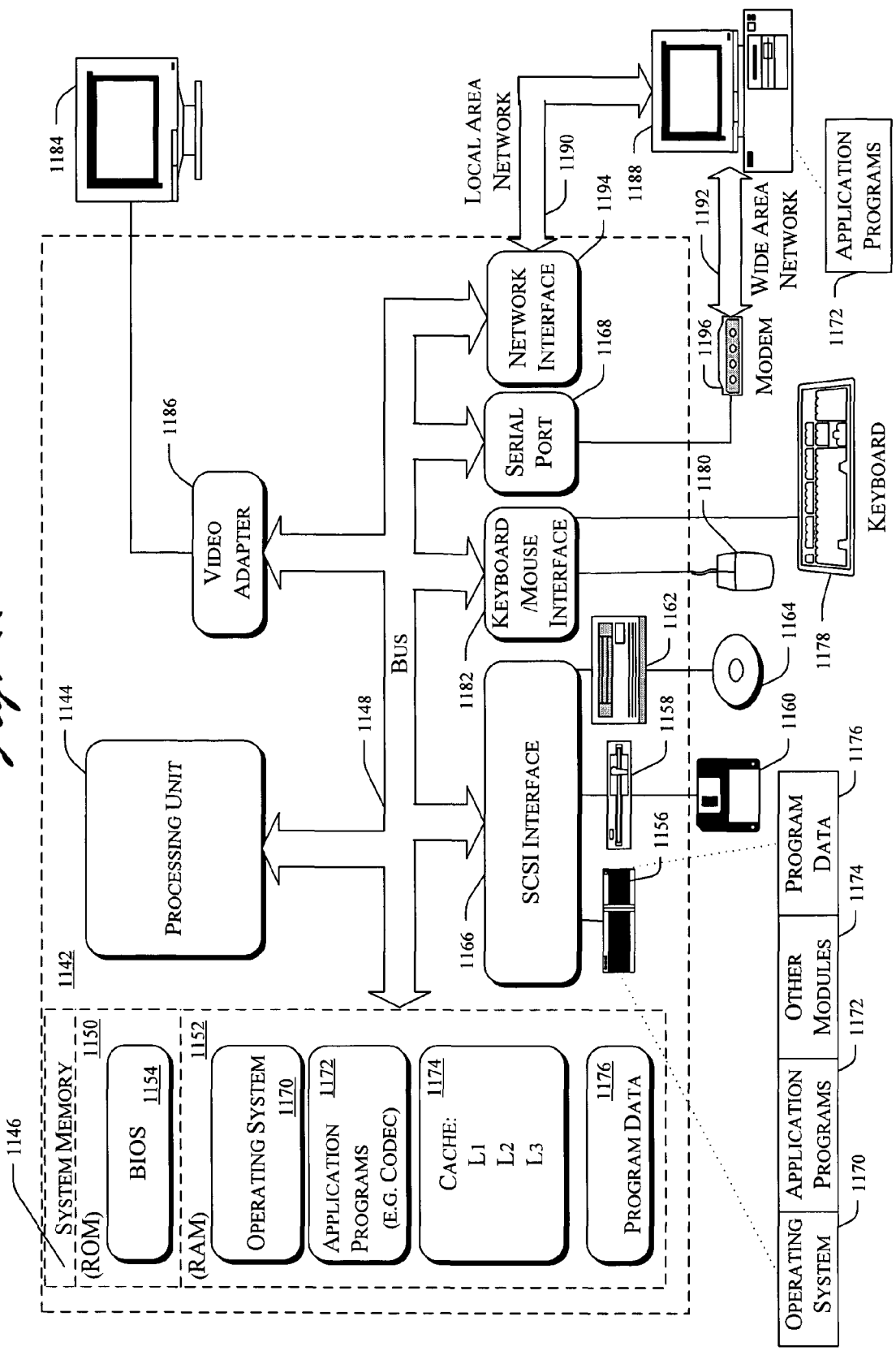
FIG. 11 illustrates an example of a computing environment within which the solutions, software applications, methods and systems described herein can be either fully or partially implemented.

FIG. 11 shows an exemplary computer system and environment that can be used to implement the processes described herein. A computer 1142, which can be similar to computer 112 in FIG. 1, includes one or more processors or processing units 1144, a system memory 1146, and a bus 1148 that couples various system components including the system memory 1146 to processors 1144. The bus 1148 represents one or more of any of several types of bus structures, including a memory bus or memory controller, a peripheral bus, an accelerated graphics port, and a processor or local bus using any of a variety of bus architectures. The system memory 1146 includes read only memory (ROM) 1150 and random access memory (RAM) 1152. A basic input/output system (BIOS) 1154, containing the basic routines that help to transfer information between elements within computer 1142, such as during start-up, is stored in ROM 1150.

Computer 1142 further includes a hard disk drive 1156 for reading from and writing to a hard disk (not shown), a magnetic disk drive 1158 for reading from and writing to a removable magnetic disk 1160, and an optical disk drive 1162 for reading from or writing to a removable optical disk 1164 such as a CD ROM or other optical media. The hard disk drive 1156, magnetic disk drive 1158, and optical disk drive 1162 are connected to the bus 1148 by an SCSI interface 1166 or some other appropriate interface. The drives and their associated computer-readable media provide nonvolatile storage of computer-readable instructions, data structures, program modules and other data for computer 1142. Although the exemplary environment described herein employs a hard disk, a removable magnetic disk 1160 and a removable optical disk 1164, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1156, magnetic disk 1160, optical disk 1164, ROM 1150, or RAM 1152, including an operating system 1170, one or more application programs 1172 (such as the electronic forms application 112), other program modules 1174, and program data 1176. A user may enter commands and information into computer 1142 through input devices such as a keyboard 1178 and a pointing device 1180. Other input devices (not shown) may include a microphone, joystick, game pad, satellite dish, scanner, or the like. These and other input devices are connected to the processing unit 1144 through an interface 1182 that is coupled to the bus 1148. A monitor 1184 or other type of display device is also connected to the bus 1148 via an interface, such as a video adapter 1186. In addition to the monitor, personal computers typically include other peripheral output devices (not shown) such as speakers and printers.

Computer 1142 commonly operates in a networked environment using logical connections to one or more remote computers, such as a remote computer 1188. The remote computer 1188 may be another personal computer, a server, a router, a network PC, a peer device or other common network node, and typically includes many or all of the elements described above relative to computer 1142. The logical connections depicted in FIG. 5 include a local area network (LAN) 1190 and a wide area network (WAN) 1192. Such networking environments are commonplace in offices, enterprise-wide computer networks, intranets, and the Internet.

When used in a LAN networking environment, computer 1142 is connected to the local network through a network interface or adapter 1194. When used in a WAN networking environment, computer 1142 typically includes a modem 1196 or other means for establishing communications over the wide area network 1192, such as the Internet. The modem 1196, which may be internal or external, is connected to the bus 1148 via a serial port interface 1168. In a networked environment, program modules depicted relative to the personal computer 1142, or portions thereof, may be stored in the remote memory storage device. It will be appreciated that the network connections shown are exemplary and other means of establishing a communications link between the computers may be used.

Generally, the data processors of computer 1142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The disclosed declarative solution definition covers many aspects of a disclosed solution, including how the solution is defined declaratively in an XML based language. Moreover, implementations described herein enable the user to edit a data file when offline by discovering and deploying the data file's solution. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A solution for a data file, the data file having a hierarchical arrangement of a plurality of nodes, each said node each having a structure, and wherein the solution comprises:

a unique name that is the same as a name computed from a solution identifier in the data file, and enables discovery and deployment of the solution when the data file is opened; and a presentation application which, when executed in conjunction with opening the data file, displays data in the data file in a plurality of data-entry fields in an electronic form, wherein the plurality of data-entry fields of the electronic form are mapped to a corresponding plurality of the nodes of the data file.

2. The solution as defined in claim 1, wherein the unique name is computed without user interaction and by an electronic forms application executing on a computer and configured to discover and deploy the solution of the data file.

3. The solution as defined in claim 1, wherein:

the electronic form is written in XHTML and is rendered when the presentation application is executed by an electronic forms application executing on a computer; and the plurality of data-entry fields of the electronic form are mapped to a corresponding plurality of the nodes of the data file; and through each said data-entry field:

data is received by input from a user entering the data into the electronic form through one or more of the data-entry fields for storage in a corresponding said node in the data file; and data in the data file is viewed by the user in the electronic form through the data-entry fields via the mapping of the data-entry field from corresponding said nodes of the data file.

4. The solution as defined in claim 3, wherein when a logic application is executed by the electronic forms application executing on the computer:
   a validation is performed to determine if the data received by input from the user is valid or invalid; and
   when the validation determines that the data received by input from the user is invalid, the electronic forms application outputs a dialog box bearing indicia informing the user that the data input is invalid.

5. The solution as defined in claim 4, wherein:
   the validation of the data received by input from the user into each said data-entry field is performed with a validation rule;
   the logic application comprises a plurality of the validation rules for:
      a corresponding plurality of the nodes in the data file; and
      a corresponding plurality of the data-entry fields; the validation uses each said validation rule to:
         determine if the data received by input from the user into a corresponding said data-entry field is valid or invalid; and
         require the user to correct any data input into the corresponding said data-entry field that the validation determines to be invalid.

6. The solution as defined in claim 5, wherein each said validation rule is based on a part of a schema governing a corresponding said node.

7. The solution as defined in claim 5, wherein each said validation rule is written in script and associated with a corresponding said node.

8. The solution as defined in claim 5, wherein each said validation rule is written in a declarative syntax and associated with a corresponding said node.

9. The solution as defined in claim 5, wherein:
   each said validation rule includes an alert area display; and
   when the validation uses one said validation rule to determine that the data received by input from the user into a corresponding said data-entry field is invalid, the corresponding alert area display is output so as to be associated with the corresponding said data-entry field.

10. The solution as defined in claim 9, wherein when the alert area display is output, the output includes one or more characteristics selected from the group consisting of:
   graphics surrounding the corresponding said data-entry field;
   the alert area display surrounds the corresponding said data-entry field;
   the alert area display includes graphics containing a red, dashed-lined box;
   the alert area display includes graphics highlighting the data in the corresponding said data-entry field;
   the alert area display surrounds the corresponding said data-entry field and includes the graphics containing a squiggly line beneath the data in the corresponding said data-entry field;
   the alert area display includes text containing information about the invalid data in the corresponding said data-entry field;
   the alert area display includes text containing information about the corresponding said data-entry field; and
   the alert area display includes a pop-up window.

11. The solution as defined in claim 5, wherein each said node has one or more of the validation rules associated therewith.

12. the solution as defined in claim 5, wherein one said validation rule includes a requirement that the data received by input from the user into a corresponding said data-entry field is to be within a certain range.

13. The solution as defined in claim 5, wherein one said validation rule includes a requirement that the data received by input from the user into a corresponding said data-entry field is to be within a certain range of text or numerals for a setting of one or more bounds of the certain range.

14. The solution as defined in claim 5, wherein one said validation rule includes a requirement that the data received by input from the user into a corresponding said data-entry field is to be numerical.

15. The solution as defined in claim 5, wherein one said validation rule includes a requirement that the data received by input from the user into a corresponding said data-entry field is to be textual.

16. The solution as defined in claim 5, wherein one said validation rule includes a requirement for the data received by input from the user into a corresponding said data-entry field that references another said node in the data file.

17. The solution as defined in claim 5, wherein the plurality of the validation rules are associated by mapping to the corresponding plurality of the nodes in the data file.

18. The solution as defined in claim 5, wherein each said validation rule is associated by mapping to a corresponding said data-entry field by an XPath expresion.

19. The solution as defined in claim 5, wherein each said validation rule is associated by mapping to a corresponding said data-entry field by use of a declarative syntax.

20. The solution as defined in claim 5, wherein each said validation rule is script-based.

21. The solution as defined in claim 20, wherein the script-based validation rule maps to a corresponding said node with an XPath expression.

22. The solution as defined in claim 20, wherein the script-based validation rule maps to a corresponding said node with an event handler.

23. The solution as defined in claim 20, wherein the script-based validation rule maps to a corresponding said node with an event handler that determines when a real-time validation tool uses the script-based validation rule.

24. The solution as defined in claim 20, wherein the script-based validation rule maps to a corresponding said node with an event handler that determines when a real-time validation tool uses the script-based validation rule before data received for the node is held by the data file.

25. The solution as defined in claim 20, wherein the script-based validation rule maps to a corresponding said node with an event handler that determines when a real-time validation tool uses the script-based validation rule after data received for the node is held by the data file.

26. The solution as defined in claim 5, wherein each said validation rule includes:
   an alert area display; and
   how the alert area display is to appear when output.

27. A solution for a data file, the data file having a hierarchical arrangement of a plurality of nodes, each said node each having a structure, and wherein the solution comprises:
   a unique name that is the same as a name computed from a solution identifier in the data file and enables discovery and deployment of the solution when the data file is opened;

a presentation application which, when executed in conjunction with the opening of the data file, displays data in the data file in a plurality of data-entry fields in an electronic form, wherein the plurality of data-entry fields of the electronic form are mapped to a corresponding plurality of the nodes of the data file; and a manifest of all files usable for:

representing the data file in the electronic form;

allowing a user to input data into the data-entry fields; and validating the data that the user inputs into the data-entry fields.

28. The solution as defined in claim 27, wherein:

the data file is written in XML;

the presentation application is written in XSLT; and the electronic form is written in XHTML.

29. A solution for a structured markup-language document, the solution comprising:

a markup-language schema based on the structured markup-language document, wherein fragments of the markup-language schema are coupled with portions of the markup-language document; and a presentation application which, when executed, transforms the coupled portions of the markup-language document into an electronic form.

30. The solution as defined in claim 29, wherein:

the structured markup-language document is written in XML;

the presentation application is written in XSLT;

the electronic form is written in XHTML and has one or more data-entry fields; and the solution further comprises a manifest of all files that can be used for:

representing the structured markup-language document in the electronic form;

allowing a user in input data into the one or more data-entry fields; and validating the data that the user inputs into the one or more data-entry fields.

31. The solution as defined in claim 29, wherein the coupled portions contain information setting forth all possible structured markup-language documents for the coupled portions.

32. The solution as defined in claim 29, further comprising a special name that can be computed from a solution identifier in the markup-language document, wherein the solution can be discovered using the special name.

33. The solution as defined in claim 32, wherein the solution identifier is a URL.

34. The solution as defined in claim 32, wherein the solution identifier is a URN.

35. The solution as defined in claim 32, wherein the special name is unique.

36. The solution as defined in claim 32, wherein the special name that can be computed from a solution identifier in the data file is performed with a one-way hash.

37. The solution as defined in claim 36, wherein the one-way hash is an MD5 hash.

38. The solution as defined in claim 32, wherein the solution identifier in the markup-language document can be read from a processing instruction in the markup-language document.

39. A solution comprising:

pieces of markup-language data of a markup-language document, the markup-language data having portions, each said portion having a structure;

a unique name that is the same as a name computed from a solution identifier in the markup-language document and enables discovery and deployment of the solution: and a presentation application which, when executed responsive to being discovered using the unique name, transforms the pieces of markup-language data into an electronic form according to the structure of the corresponding said portions.

40. The solution as defined in claim 39, wherein:

the markup-language data is written in XML;

the presentation application is written in XSLT;

the electronic form is written in XHTML and has one or more data-entry fields; and the solution further comprises a manifest of all files that can be used for:

representing the markup-language data in the electronic form;

allowing a user in input data into the one or more data-entry fields; and validating the data that the user inputs into the one or more data-entry fields.

41. A solution comprising:

a markup-language schema from which a markup-language document can be inferred that has a structure based on the markup-language schema, wherein portions of the markup-language document are logically coupled with fragments of the markup-language schema; and a presentation application which, when executed, forms an electronic form containing data-entry fields associated with the coupled portions.

42. The solution as defined in claim 41, wherein:

the markup-language document is written in XML;

the presentation application is written in XSLT;

the electronic form is written in XHTML; and the solution further comprises a manifest of all files that can be used for:

representing the markup-language document in the electronic form;

allowing a user in input data into the one or more data-entry fields; and validating the data that the user inputs into the one or more data-entry fields.

43. The solution as defined in claim 41, wherein the coupled portions contain information selling forth all possible markup-language documents for the coupled portions.

44. The solution as defined in claim 41, wherein the markup-language schema does not conform to a recognized standard.

45. The solution as defined in claim 41, wherein the markup-language schema defines an arbitrary syntax.

46. The solution as defined in claim 41, farther comprising a special name that can be computed from a solution identifier in the markup-language document, wherein the solution can be discovered using the special name.

47. A method comprising:

receiving an instruction to open a markup-language document having a structure and a solution identifier;

computing a unique name using the solution identifier;

discovering a solution using the unique name;

opening the markup-language document with the solution, wherein:

the solution includes a presentation application and a markup-language schema;

the markup-language document can be inferred from the markup-language schema; and portions of the markup-language document are logically coupled with fragments of the markup-language schema;

executing the presentation application to render an electronic form containing data-entry fields associated with the coupled portions.

48. The method as defined in claim 47, wherein:
the markup-language document is written in XML;
the presentation application is written in XSLT;
the electronic form is written in XHTML; and
the solution further comprises a manifest of all files that can be used for:
  representing the markup-language document in the electronic form;
  allowing a user in input data into the one or more data-entry fields; and
  validating the data that the user inputs into the one or more data-entry fields.

49. The method as defined in claim 47, wherein the coupled portions contain information setting forth all possible markup-language documents for the coupled portions.

50. The method as defined in 47, wherein the data-entry fields of the electronic form map to a corresponding plurality of nodes of the markup-language document; and the method further comprises:
  receiving, through one or more said data-entry fields, data input by a user for storage in a corresponding said node in the markup-language document; and
  outputting data in the markup-language for viewing by the user in the electronic form through the data-entry fields via the mapping of the data-entry fields from corresponding said nodes of the markup-language document.

51. The method as defined in claim 50, wherein:
the markup-language schema includes a logic application; and
the method further comprises:
  executing the logic application to perform a validation to determine if the data received by input from the user is valid or invalid; and
  when the validation determines that the data received by input from the user is invalid, outputting a dialog box bearing indicia informing the user that the data input is invalid.

52. The method as defined in claim 51, wherein:
the validation is performed on the data received by input from the user into each said data-entry field with a validation rule;
the logic application comprises a plurality of the validation rules for:
  a corresponding plurality of the nodes in the markup-language document; and
  a corresponding plurality of the data-entry fields; the validation uses each said validation rule to:
    determine if the data received by input from the user into a corresponding said data-entry field is valid or invalid; and
    require the user to correct any data input into the corresponding said data-entry field that the validation determines to be invalid.

53. The method as defined in claim 52, wherein each said validation rule is based on a part of a schema governing a corresponding said node.

54. The method as defined in claim 52, wherein each said validation rule is written in script and associated with a corresponding said node.

55. The method as defined in claim 52, wherein each said validation rule is written in a declarative syntax and associated with a corresponding said node.

56. The method as defined in claim 52, wherein:
each said validation rule includes an alert area display; and
the validation further comprises using one said validation rule to determine that the data received by input from the user into a corresponding said data-entry field is invalid and outputting the corresponding alert area display so as to be associated with the corresponding said data-entry field.

57. The method as defined in claim 56, wherein when the alert area display is output the output includes one or more characteristics selected from the group consisting of:
  graphics surrounding the corresponding said data-entry field;
  the alert area display surrounds the corresponding said data-entry field;
  the alert area display includes graphics containing a red, dashed-lined box;
  the alert area display includes graphics highlighting the data in the corresponding said data-entry field;
  the alert area display surrounds the corresponding said data-entry field and includes the graphics containing a squiggly line beneath the data in the corresponding said data-entry field;
  the alert area display includes text containing information about the invalid data in the corresponding said data-entry field;
  the alert area display includes text containing information about the corresponding said data-entry field; and
  the alert area display includes a pop-up window.

58. The method as defined in claim 52, wherein each said node has one or more of the validation rules associated therewith.

59. The method as defined in claim 52, wherein one said validation rule includes a requirement that the data received by input from the user into a corresponding said data-entry field is to be within a certain range.

60. The method as defined in claim 52, wherein one said validation rule includes a requirement that the data received by input from the user into a corresponding said data-entry field is to be within a certain range of text or numerals for a setting of one or more bounds of the certain range.

61. The method as defined in claim 52, wherein one said validation rule includes a requirement that the data received by input from the user into a corresponding said data-entry field is to be numerical.

62. The method as defined in claim 52, wherein one said validation rule includes a requirement that the data received by input from the user into a corresponding said data-entry field is to be textual.

63. The method as defined in claim 52, wherein one said validation rule includes a requirement for the data received by input from the user into a corresponding said data-entry field that references another said node in the data file.

64. The method as defined in claim 52, wherein the plurality of the validation rules are associated by mapping to the corresponding plurality of the nodes in the data file.

65. The method as defined in claim 52, wherein each said validation rule is associated by mapping to a corresponding said data-entry field by an XPath expression.

66. The method as defined in claim 52, wherein each said validation rule is associated by mapping to a corresponding said data-entry field by use of a declarative syntax.

67. The method as defined in claim 52, wherein each said validation rule is script-based.

68. The method as defined in claim 67, wherein the script-based validation rule maps to a corresponding said node with an XPath expression.

69. The method as defined in claim 67, wherein the script-based validation rule maps to a corresponding said node with an event handler.

70. The method as defined in claim 67, wherein the script-based validation rule maps to a corresponding said node with an event handler that determines when a real-time validation tool uses the script-based validation rule.

71. The method as defined in claim 67, wherein the script-based validation rule maps to a corresponding said node with an event handler that determines when a real-time validation tool uses the script-based validation rule before data received for the node is held by the data file.

72. The method as defined in claim 67, wherein the script-based validation rule maps to a corresponding said node with an event handler that determines when a real-time validation tool uses the script-based validation rule after data received for the node is held by the data file.

73. The method as defined in claim 52, wherein each said validation rule includes:
an alert area display; and
how the alert area display is to appear when output.

74. A computer-readable medium comprising instruction that, when executed by a computer, performs the method of claim 47.

75. A computer-readable medium including instructions that, when executed by a computer, perform acts comprising:
initiating a request to open a structured markup-language document including a solution identifier;
using the solution identifier to discover a solution that includes a presentation application and a markup-language schema that is based on the structured markup-language document, wherein fragments of the markup-language schema are coupled with portions of the markup-language document; and
executing the presentation application to transform the coupled portions of the markup-language document into an electronic form.

76. The computer-readable medium as defined in claim 75, wherein:
the structured markup-language document is written in XML;
the presentation application is written in XSLT;
the electronic form is written in XHTML and has one or more data-entry fields; and
the solution further comprises a manifest of all files that can be used for:
representing the structured markup-language document in the electronic form;
allowing a user in input data into the one or more data-entry fields; and
validating the data that the user inputs into the one or more data-entry fields.

77. The computer-readable medium as defined in claim 75, wherein the coupled portions contain information setting forth all possible structured markup-language documents for the coupled portions.

78. A computer-readable medium including instructions that, when executed by a computer, perform acts comprising:
initiating a request to open a markup-language document including a solution identifier;
using the solution identifier to discover a solution that includes a presentation application and a markup-language schema from which a markup-language document can be inferred that has a structure based on the markup-language schema, wherein portions of the markup-language document are logically coupled with fragments of the markup-language schema; and
executing the presentation application to form an electronic form containing data-entry fields associated with the coupled portions.

79. The computer-readable medium as defined in claim 78, wherein:
the markup-language document is written in XML;
the presentation application is written in XSLT;
the electronic form is written in XHTML and has one or more data-entry fields; and
the solution further comprises a manifest of all files that can be used for:
representing the markup-language document in the electronic form;
allowing a user in input data into the one or more data-entry fields; and
validating the data that the user inputs into the one or more data-entry fields.

80. The computer-readable medium as defined in claim 78, wherein the coupled portions contain information setting forth all possible markup-language documents for the coupled portions.

* * * * *